United States Patent
Schmit et al.

(10) Patent No.: US 11,385,887 B2
(45) Date of Patent: Jul. 12, 2022

(54) MULTI-MISSION CONFIGURABLE SPACECRAFT SYSTEM

(71) Applicant: MAXAR SPACE LLC, Palo Alto, CA (US)

(72) Inventors: Sherrie Schmit, Sunnyvale, CA (US); James Pham, San Jose, CA (US); William Gray, Santa Clara, CA (US); William Hreha, San Jose, CA (US)

(73) Assignee: MAXAR SPACE LLC, Palo Alto, CA (US)

( * ) Notice: Subject to any disclaimer, the term of this patent is extended or adjusted under 35 U.S.C. 154(b) by 0 days.

(21) Appl. No.: 17/110,115

(22) Filed: Dec. 2, 2020

(65) Prior Publication Data
US 2021/0303290 A1 Sep. 30, 2021

Related U.S. Application Data

(60) Provisional application No. 62/994,651, filed on Mar. 25, 2020.

(51) Int. Cl.
*G06F 8/65* (2018.01)
*G06F 9/455* (2018.01)
*B64G 1/66* (2006.01)

(52) U.S. Cl.
CPC .............. *G06F 8/65* (2013.01); *B64G 1/66* (2013.01); *G06F 9/45533* (2013.01); *G06F 2009/4557* (2013.01); *G06F 2009/45575* (2013.01); *G06F 2009/45583* (2013.01)

(58) Field of Classification Search
CPC ............... G06F 8/65; G06F 9/45533; G06F 2009/4557; G06F 2009/45575; G06F 2009/45583; B64G 1/66
See application file for complete search history.

(56) References Cited

U.S. PATENT DOCUMENTS

| | | | |
|---|---|---|---|
| 5,810,297 A * | 9/1998 | Basuthakur | B64G 1/1085 244/158.8 |
| 7,769,701 B2 | 8/2010 | Carus | |
| 9,602,580 B2 | 3/2017 | Subhani | |
| 9,641,238 B1 * | 5/2017 | Coleman | H04L 67/34 |
| 9,722,692 B1 * | 8/2017 | Coleman | G06F 9/45533 |
| 9,740,465 B1 * | 8/2017 | Coleman | G06F 8/60 |
| 9,819,742 B1 * | 11/2017 | Coleman | G06F 11/2041 |

(Continued)

OTHER PUBLICATIONS

Schmit, et al., "Multi-Mission Configurable Spacecraft System," U.S. Appl. No. 62/994,651, filed Mar. 25, 2020.

*Primary Examiner* — Phillip H Nguyen
(74) *Attorney, Agent, or Firm* — Vierra Magen Marcus LLC

(57) ABSTRACT

A scalable, extensible, multi-tenancy multi-mission configurable spacecraft system is provided that allows applications to be deployed and managed across many spacecraft. One embodiment includes a plurality of satellites in orbit, where each satellite includes an antenna, a memory configured to store a non-virtualized operating system and one or more software applications, and a processor connected to the antenna and the memory. The processor is configured to run the non-virtualized operating system and to run the one or more software applications. The processors and the applications can be managed by ground terminals or other satellites.

15 Claims, 14 Drawing Sheets

(56) References Cited

U.S. PATENT DOCUMENTS

| | | |
|---|---|---|
| 9,882,632 B1 | 1/2018 | Fang |
| 9,887,764 B1 | 2/2018 | Karim |
| 10,048,987 B1 * | 8/2018 | Graham ............... G06F 9/5011 |
| 10,069,935 B1 | 9/2018 | Coleman |
| 10,079,719 B2 | 9/2018 | Dhanakshirur |
| 10,110,418 B2 | 10/2018 | Liang |
| 10,191,778 B1 | 1/2019 | Yang |
| 10,200,922 B2 | 2/2019 | Fang |
| 10,218,431 B2 | 2/2019 | Sobhani |
| 10,237,118 B2 | 3/2019 | Du |
| 10,303,576 B1 | 5/2019 | Seymour |
| 10,313,178 B2 | 6/2019 | Kumar |
| 10,419,394 B2 | 9/2019 | Chou |
| 10,491,710 B2 | 11/2019 | Coleman |
| 10,498,595 B1 * | 12/2019 | Narayanasamy ... H04L 41/0806 |
| 10,523,758 B2 | 12/2019 | Coleman |
| 10,530,747 B2 | 1/2020 | Saxena |
| 10,530,815 B2 | 1/2020 | Chou |
| 10,536,107 B1 * | 1/2020 | Ning ........................ B64G 1/44 |
| 2007/0250267 A1 | 10/2007 | Jaeger |
| 2009/0320102 A1 | 12/2009 | Ou |
| 2013/0163808 A1 | 6/2013 | Clements |
| 2017/0264684 A1 | 9/2017 | Spillane |
| 2019/0065323 A1 | 2/2019 | Dhamdhere |
| 2019/0087220 A1 | 3/2019 | Turner |
| 2019/0095102 A1 | 3/2019 | Wade |
| 2019/0180434 A1 | 6/2019 | Sheth |
| 2019/0207672 A1 | 7/2019 | Arora |
| 2019/0228303 A1 | 7/2019 | Liu |
| 2019/0253134 A1 * | 8/2019 | Coleman ............ H04B 7/18513 |
| 2019/0312778 A1 | 10/2019 | Netanel |
| 2020/0028578 A1 * | 1/2020 | Coleman ................ H04L 67/32 |
| 2020/0034240 A1 | 1/2020 | Natanzon |
| 2020/0034254 A1 | 1/2020 | Natanzon |
| 2020/0049837 A1 | 2/2020 | Werner |

* cited by examiner

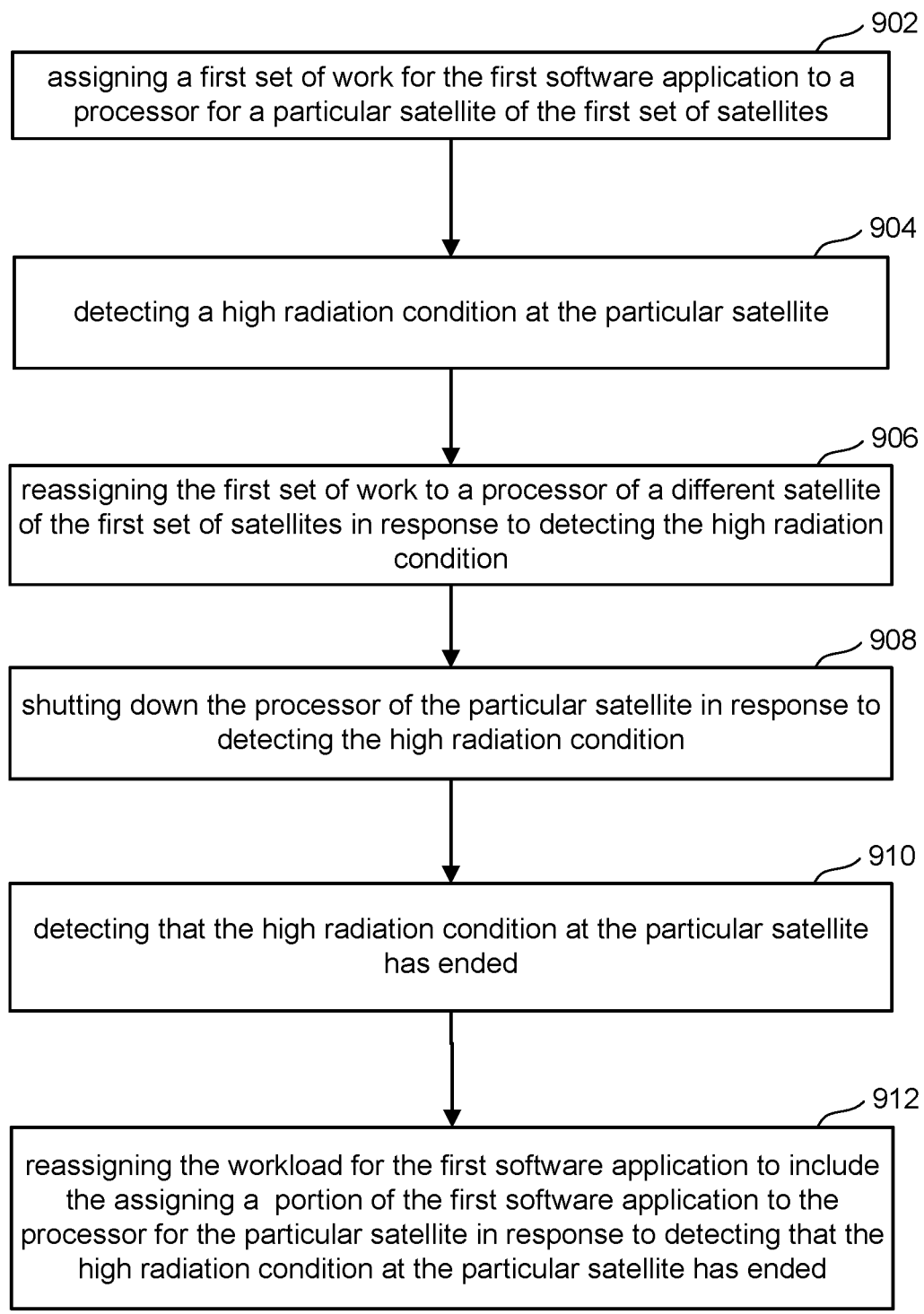

MULTI-MISSION CONFIGURABLE SPACECRAFT SYSTEM

CROSS-REFERENCE TO RELATED APPLICATION

This application claims the benefit of U.S. Provisional Patent Application No. 62/994,651, "Multi-Mission Configurable Spacecraft System," filed on Mar. 25, 2020, which is hereby incorporated by reference in its entirety.

BACKGROUND

The number of space activities and the number of entities performing space activities has been increasing. For purposes of this document, space activities are functions performed completely or partially in space. The term "space" refers to being beyond the Earth's atmosphere, in orbit around the Earth, or at a distance from the Earth's surface that is equivalent to (or greater than) a distance of an object in orbit around the Earth. Examples of space activities include communication, transport, solar system exploration and scientific research. For example, the International Space Station is an orbiting research facility that functions to perform world-class science and research that only a microgravity environment can provide. Other activities performed in space can also be considered space activities.

Satellites can be deployed into orbit to provide various space activities, such as military and civilian observation operations, communications operations, navigation operations, weather operations, and research operations. Satellites can include various sensors and communication equipment that are used to perform desired tasks. Although satellites can be configured to perform these specialized operations, satellites are expensive to build and launch into orbit, especially for organizations that may not require the use of an entire satellite with a large number of sensors, or may not require continuous operations on the satellite. As a result, organizations may avoid the use of satellites, limiting the use of promising satellite technology.

For example, satellites are typically inflexible, with limited ability for in-orbit software updates. Thus, when the business need for a satellite ends, the owner of the satellite may no longer be able to justify the costs of the satellite.

Satellites are typically designed for peak use. However, there may belong periods of time where utilization rate is below peak, thereby leaving capacity unused. Designing for highest capacity results in a higher costs, which may not be recouped if capacity is idle.

Most systems use separate infrastructures for ground systems and space systems, with little or no shared resources. This also increases costs to the owner and/or operator of the satellite.

Additionally, satellite systems typically have little or no autonomous ability other than to follow rule based scripts. Such a configuration can be slow to respond to problems, which results in additional costs.

BRIEF DESCRIPTION OF THE DRAWINGS

FIG. 15 is a flow chart describing one embodiment of a process for operating a multi-mission configurable spacecraft system.

DETAILED DESCRIPTION

A multi-mission configurable spacecraft system is proposed that is an advanced modular scalable space-based platform that enables multiple missions, tenants and resources to be shared across spacecraft and ground nodes. The system comprises a plurality of spacecraft in orbit and a plurality of ground-based computing nodes, each of which can be used as a node in a multi-node system for performing a programmable function. For example, one or more software applications can be deployed across a plurality of spacecraft and/or ground-based computing nodes to program the spacecraft and/or ground-based computing nodes to perform one or more functions (the mission). In one embodiment, each spacecraft includes an antenna, a memory configured to store one or more software applications and a processor connected to the antenna and the memory. Each ground-based computing node includes a memory configured to store one or more software applications and a processor connected to the memory so that the processor is configured to run the one or more software applications. Software applications can be deployed across different sets of the spacecraft and/or ground computing nodes.

In one embodiment, the spacecraft and ground-based computing nodes are grouped into clusters such that each spacecraft and/or ground-based computing node represents a node in a cluster. One node in each cluster represent a cluster master that provides management duties for other nodes in the cluster. Nodes can be added to clusters on the fly and removed from clusters on the fly. A multi-layered environment provides isolation across single or groups of related services/applications.

One embodiment of the current proposal allows for dynamically changing missions; reallocating resources that are shared across nodes, including limited on-board CPU, GPU, FPGA, network, memory and storage across spacecraft nodes; common infrastructure and consistent user interface with consistent view for access and interaction across all or multiple systems; a quick and continuous integration and deployment pipeline (including on-orbit); isolated deployment of applications; easily adding or removing resources with autonomous work load redistribution; and resilient autonomous self-heal across all nodes within multi-tenancy resource constraints without ground connectivity.

Figure 1:
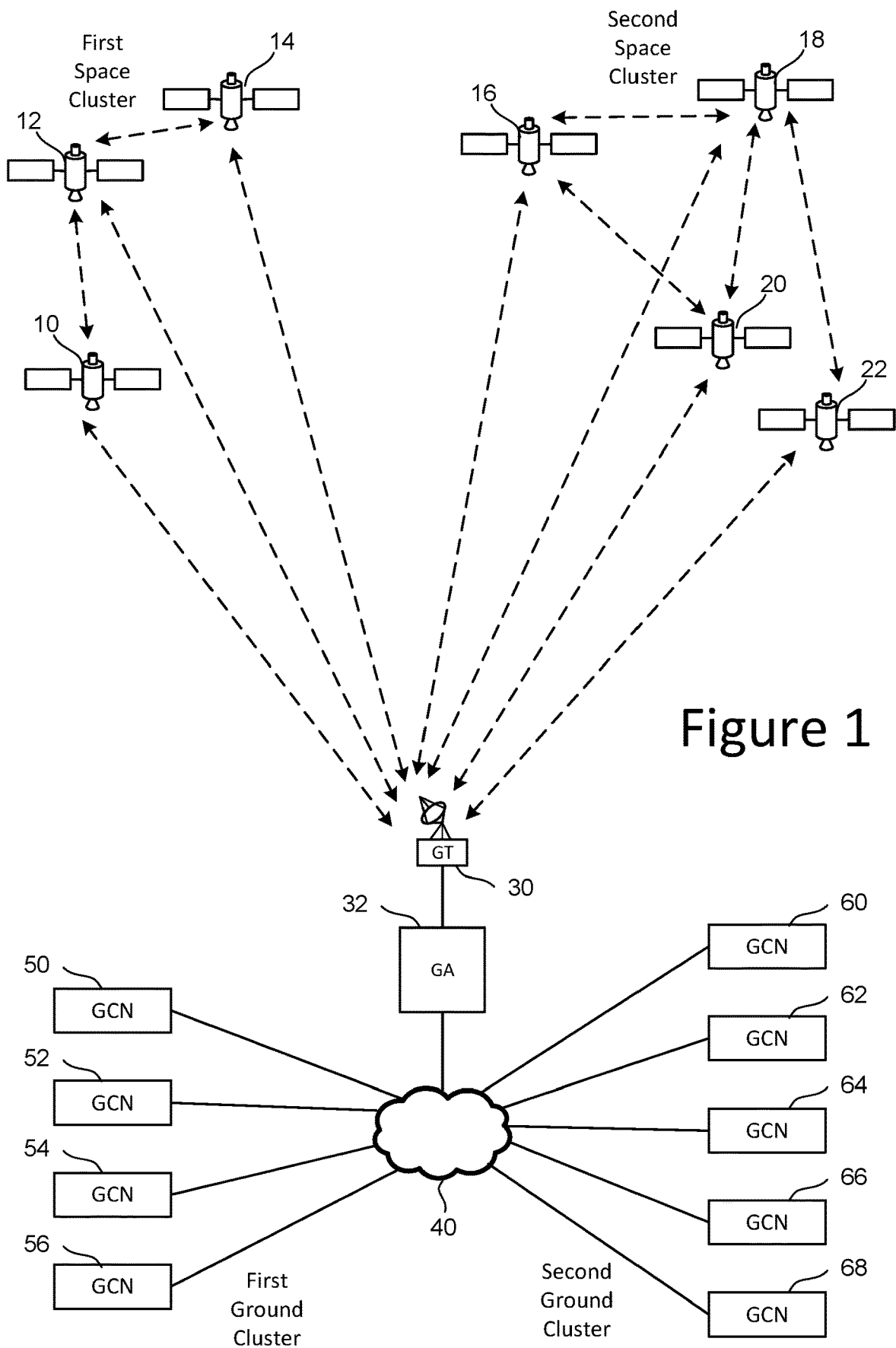
FIG. 1 is a block diagram of a multi-mission configurable spacecraft system.

FIG. 1 is a block diagram of one embodiment of a multi-mission configurable spacecraft system. One example of a spacecraft is a satellite. One embodiment of a multi-mission configurable spacecraft system includes a plurality of satellite. For example, the system of FIG. 1 includes satellites 10, 12, 14, 16, 18, 20 and 22; ground terminal 30; Global Administrator 32; network 40; and ground-based computing nodes 50, 52, 54, 56, 60, 62, 64, 66 and 68. In one example implementation, satellites 10, 12, 14, 16, 18, 20 and 22 are in orbit around the Earth, such as Geostationary Orbit, Medium Earth Orbit, Low Earth Orbit, or other orbit. In other implementations, satellites 10, 12, 14, 16, 18, 20 and 22 are in orbit around another body. Although FIG. 1 depicts the multi-mission configurable spacecraft system having satellites, in other embodiments the multi-mission configurable spacecraft system can utilize other types of spacecraft (e.g., space shuttles, manned spacecrafts, unmanned spacecrafts, inter-planetary vehicles, space stations, high altitude balloons, etc.).

The dashed lines depicted in FIG. 1 indicate wireless communication (e.g., RF or optical communication). For example, in one embodiment, satellites 10, 12, 14, 16, 18, 20 and 22 are all in direct wireless communication with ground terminal 30 and with each other. In some implementations, one or more of satellites 10, 12, 14, 16, 18, 20 and 22 are in direct wireless communication with a subset of the other satellites.

Global Administrator 32 is connected (wired or wireless) with ground terminal 30 and network 40. Global Administrator 32 maintains status of, sends instructions to and is used to maintain the satellites and ground-based computing nodes depicted in FIG. 1. In one embodiment, Global Administrator 32 is a computing device (e.g., server).

Network 40 can be a wired network, wireless network or a combination of wired and wireless. Network 40 can be the Internet, a Local Area Network, a private or public Wide Area Network, another type of network, or a combination of the above. The number of satellites and ground-based computing nodes depicted in FIG. 1 is just one example, and other embodiments of the multi-mission configurable spacecraft system can have more or less satellites and/or ground-based computing nodes than depicted in FIG. 1.

Each of satellites 10, 12, 14, 16, 18, 20 and 22 and ground-based computing nodes 50, 52, 504, 56, 60, 62, 64, 66 and 68 can be used as a node in a multi-node system for performing a programmable function, as discussed herein. In one embodiment, the spacecraft and ground-based computing nodes are grouped into clusters such that each spacecraft and/or ground-based computing node represents a node in a cluster. For purposes of this document, a cluster is a set of loosely or tightly connected computers or computing devices that work together so that, in many respects, they can be viewed as a single system. Clusters are configured such that each node can (but is not required to) be set to perform the same task, controlled and scheduled by software in a cluster master (or elsewhere). FIG. 1 depicts four clusters: First Space Cluster, Second Space Cluster, First Ground Cluster and Second Space Cluster. First Space Cluster comprises satellites 10, 12 and 14. Second Space Cluster comprises satellites 16, 18, 20 and 22. In other embodiments, the space based clusters can have more or less than the number of spacecraft depicted in FIG. 1. Other embodiments include more than two space based clusters. First Ground Cluster comprises ground-based computing nodes 50, 52, 54, and 56. Second Ground Cluster comprises ground-based computing nodes 60, 62, 64, 66 and 68. In other embodiments, the ground based clusters can have more or less than the number of ground-based computing nodes depicted in FIG. 1. Other embodiments include more than two ground-based clusters. In other embodiments, a cluster can have spacecraft and ground-based computing nodes. Additionally, the system can have more or less than the number of clusters depicted in FIG. 1. In one embodiment, one of the nodes in reach cluster is the cluster master. In other embodiments, the spacecraft and ground-based computing nodes are not grouped into clusters.

In one embodiment, a software application can be deployed across multiple nodes (e.g., spacecraft and/or ground-based computing nodes) of one or more clusters. For example, a first software application can be deployed across multiple satellites in orbit such that each satellite of the multiple satellites is executing at least a portion of the first software application. For purposes of this document, the phase "executing a software application" means that the satellites (or other spacecraft) are each executing the entire application (e.g., in parallel) and/or some or all of satellites (or other spacecraft) are executing a subset of the entire application. For example, all of the satellites of a cluster may be executing imaging software such that all of the satellites of the cluster may be taking photographs of the Earth, processing those photographs and providing resulting data to Global Administrator 32. In another example, a first subset of the satellites of a cluster may be executing a first portion of imaging software while a second subset of the satellites of the cluster may be executing a second portion of the imaging software, where the first portion of imaging software comprises taking photographs of the Earth and the second portion of the imaging software comprises processing the photographs.

Figure 2:
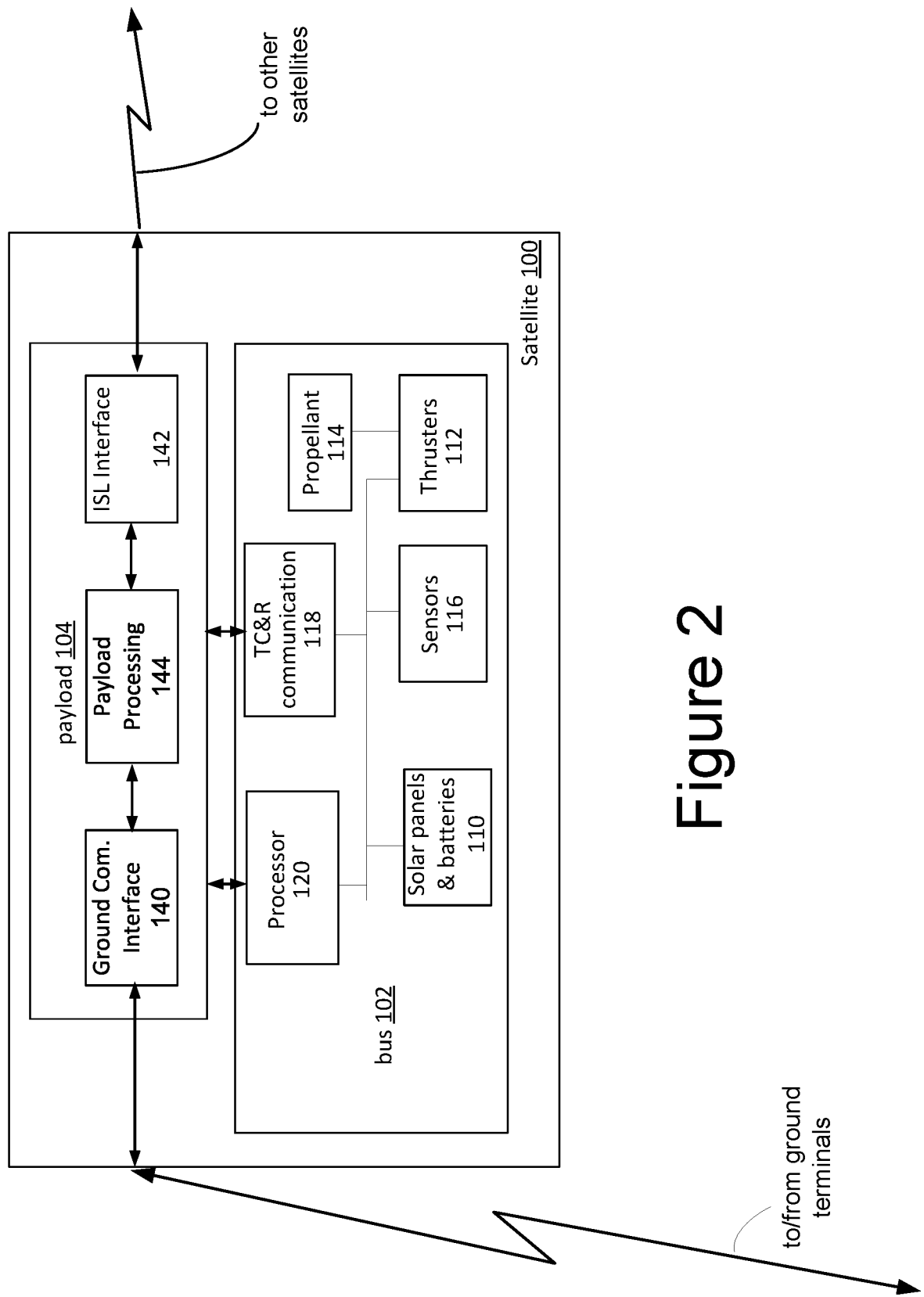
FIG. 2 is a block diagram of an example spacecraft.

FIG. 2 is a block diagram of one embodiment of a satellite 100, which can represent any of the satellites 10-22 depicted in FIG. 1. In one embodiment, satellite 100 includes a bus 102 and a payload 104 carried by bus 102. Some embodiments of satellite 100 may include more than one payload. The payload provides the functionality of the communication and/or processing systems described herein.

In general, bus 102 is the spacecraft that houses the payload. For example, the bus includes solar panels and one or more batteries 110, thrusters 112, propellant 114, sensors 116, T, C & R communication and processing equipment 118, and processor 120. Other equipment can also be included. Solar panels and batteries 110 are used to provide power to satellite 100. Thrusters 112 are used for changing the position or orientation of satellite 100 while in space. Propellant 114 is for the thrusters. Sensors 116 are used to determine the position and orientation of satellite 100. T, C & R communication and processing equipment 118 includes communication and processing equipment for telemetry, commands from the ground to the satellite and ranging to operate the satellite. Processor 120 is used to control and operate satellite 100. An operator on the ground can control satellite 100 by sending commands via T,C & R communication and processing equipment 118 to be executed by system processor 120. Some embodiments include a Network Control Center that wirelessly communicates with T,C & R communication and processing equipment 118 to send commands and control satellite 100. In one embodiment, processor 120 and T,C & R communication and processing equipment 122f are in communication with payload 104.

In one embodiment, the payload 104 includes an antenna system (not depicted) that provides a set of one or more beams (e.g., spot beams) comprising a beam pattern used to receive wireless signals from ground stations and/or other satellites, and to send wireless signals to ground stations and/or other satellites. In one example, an entire service region is covered using one beam. In another example, however, the antenna system provides a beam pattern that includes multiple spot beams, with each spot beam covering a portion of the service region. The portion of the service region covered by a spot beam is referred to as a cell. The individual spot beams divide an overall service region into a number of cells. For example, U.S. Pat. No. 7,787,819 describes a pattern of 115 spot beams covering the continental United States (CONUS), Hawaii, Alaska, and Puerto Rico. It is noted that a service region may be defined in any manner to cover any desired geographic location. In one embodiment, the antenna system includes a phased array antenna, a direct radiating antenna, or a multi-feed fed reflector.

Payload 104 also includes Ground Communication Interface 140, Inter-satellite Communication Interface 142 and Payload Processing System 144. Ground Communication Interface 140, which is connected to the antenna system (not depicted), is configured to communicate with one or more ground terminals (e.g., send and receive messages to/from gateways and/or subscriber terminals). Inter-satellite Communication Interface 142, which is connected to the antenna system (not depicted), is configured to communicate with other satellites via the in-space network, such as an in-space network.

Figure 3:
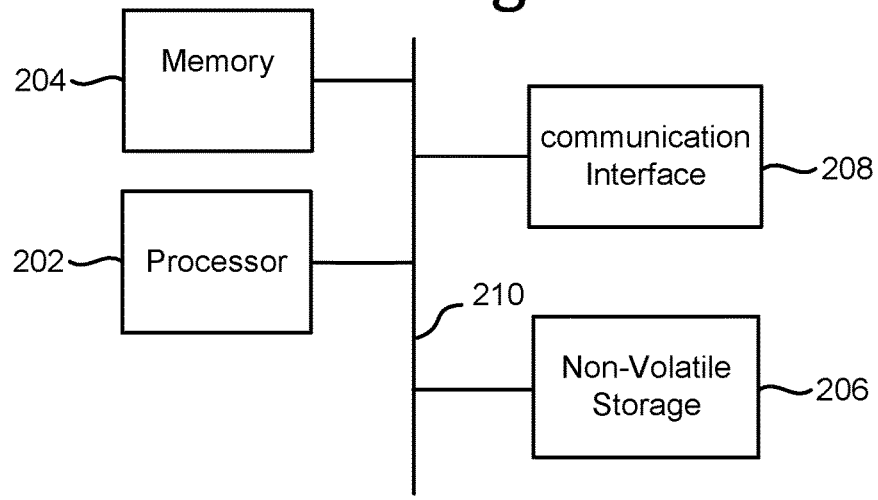
FIG. 3 is a block diagram of one embodiment of a payload processing system.

FIG. 3 is a block diagram of one example embodiment of a computing system that can be used to implement Payload Processing System 144 and perform the processes discussed. The computer system of FIG. 3 includes a processor 202, main memory 204, non-volatile storage 206, and communication interface 208. Processor 202 may contain a single microprocessor, or may contain a plurality of microprocessors for configuring the computer system as a multi-processor system. Main memory 204 stores, in part, instructions and data for execution by processor 202. In embodiments where the proposed technology is wholly or partially implemented in software, main memory 204 can store the executable code when in operation. Main memory 204 may include banks of dynamic random access memory (DRAM) as well as high speed cache memory. Non-volatile storage 206 stores data and instructions for use by processor 202. In one embodiment, non-volatile storage 206 stores the system software for implementing the proposed technology for purposes of loading to main memory 204. Non-volatile storage 206 may be implemented with a magnetic disk drive, an optical disk drive, a solid state drive, and/or other forms of flash memory. Communication interface 208 cans be any type of electrical and/or optical apparatus for enabling and managing communication, including a network interface for connecting the computer system to a network, a modem, a router, etc. For purposes of simplicity, the components shown in FIG. 3 are depicted as being connected via a single bus 210. However, the components may be connected through one or more data transport means. For example, processor 202 and main memory 204 may be connected via a local microprocessor bus, and non-volatile storage 206 and communication interface 208 may be connected via one or more input/output (I/O) buses.

In one embodiment, each of satellites 10-22 have the exact same architecture and components for Payload Processing System 144. In other embodiments, different satellites can have different architectures and components for Payload Processing System 144, meaning that the implementation of the apparatus of FIG. 3 can be different for different satellites of the same system. For example, different satellites may use different processors with different architecture for processor 202, such as one satellite using a processor from Intel and another satellite using an ARM processor (or a processor from another manufacturer using a different architecture and instruction set). In an embodiment of the current technology that includes deploying a software application across multiple satellites (or other types of spacecraft), the deploying the software application across the set of the satellites includes a first satellite of the set of satellites executing the software application using a first type of processor having a first architecture and a second spacecraft of the set of spacecrafts executing the software application using a second type of processor having a second architecture.

Figure 4:
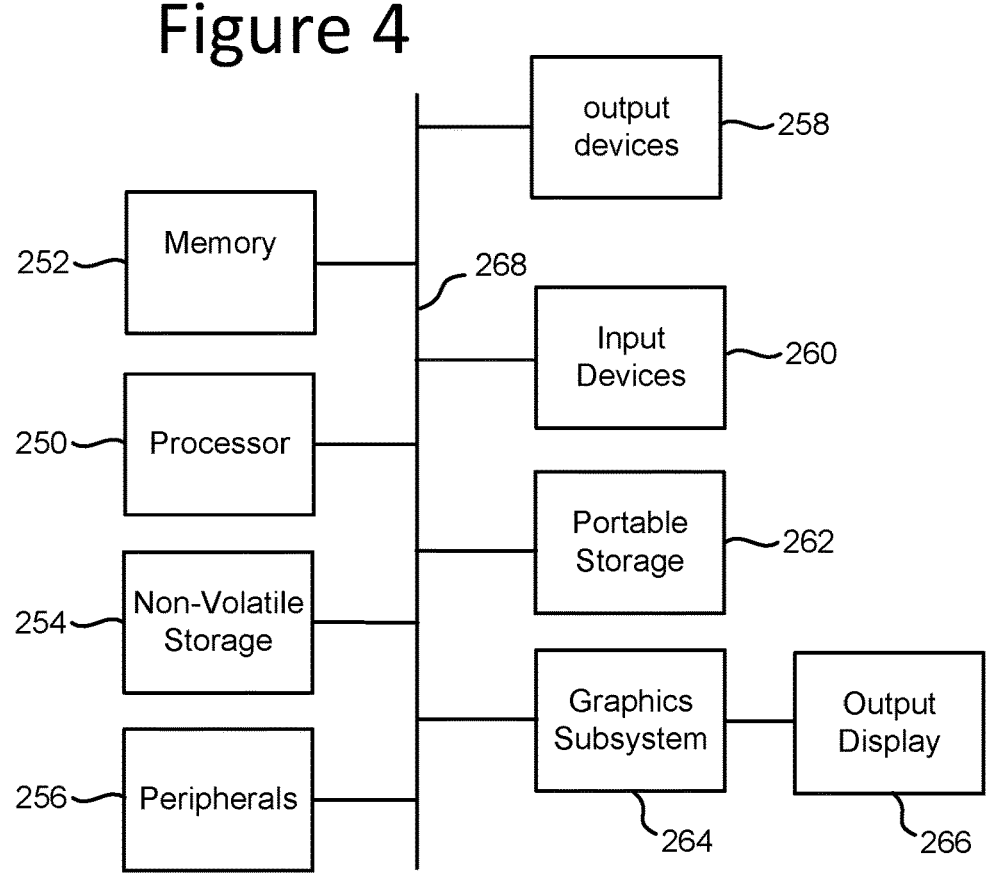
FIG. 4 is a block diagram of one embodiment of a ground-based processing system.

FIG. 4 is a block diagram of one example embodiment of a computing system that can be used to implement all or a portion of any of ground computing nodes 50-68. The computer system of FIG. 4 includes a processor 250 and main memory 252. Processor 250 may contain a single microprocessor, or may contain a plurality of microprocessors for configuring the computer system as a multi-processor system. Main memory 252 stores, in part, instructions and data for execution by processor 250. In embodiments where the proposed technology is wholly or partially implemented in software, main memory 252 can store the executable code when in operation. Main memory 252 may include banks of dynamic random access memory (DRAM) as well as high speed cache memory.

The system of FIG. 4 further includes a non-volatile storage device 254, peripheral device(s) 226, user input device(s) 260, output devices 258, portable storage medium drive(s) 262, a graphics subsystem 264 and an output display 266. For purposes of simplicity, the components shown in FIG. 4 are depicted as being connected via a single bus 268. However, the components may be connected through one or more data transport means. For example, processor 250 and main memory 252 may be connected via a local microprocessor bus, and the non-volatile storage device 254, peripheral device(s) 226, portable storage medium drive(s) 262, and graphics subsystem 264 may be connected via one or more input/output (I/O) buses. Non-volatile storage device 254, which may be implemented with a magnetic disk drive, an optical disk drive, a solid state drive or other flash memory device, is a non-volatile storage device for storing data and instructions for use by processor 250. In one embodiment, non-volatile storage device 254 stores the system software for implementing the proposed technology for purposes of loading to main memory 252.

Portable storage medium drive 262 operates in conjunction with a portable non-volatile storage medium, such as a flash device, to input and output data and code to and from the computer system of FIG. 4. In one embodiment, the system software for implementing the proposed technology is stored on such a portable medium, and is input to the computer system via the portable storage medium drive 262. Peripheral device(s) 226 may include any type of computer support device, such as an input/output (I/O) interface, to add additional functionality to the computer system. For example, peripheral device(s) 226 may include a network interface for connecting the computer system to a network, a modem, a router, etc.

User input device(s) 260 provides a portion of a user interface. User input device(s) 260 may include an alphanumeric keypad for inputting alpha-numeric and other information, or a pointing device, such as a mouse, a trackball, stylus, or cursor direction keys. In order to display textual and graphical information, the computer system of FIG. 4 includes graphics subsystem 264 and output display 266 (e.g., a monitor). Graphics subsystem 264 receives textual and graphical information, and processes the information for output to display 266. Additionally, the system of FIG. 4 includes output devices 258. Examples of suitable output devices include speakers, printers, network interfaces, monitors, etc.

In one embodiment, the spacecraft and ground-based computing nodes are grouped into clusters such that each spacecraft and/or ground-based computing node represents a node in a cluster. A cluster comprises at least one master and multiple worker machines called nodes to distribute the workload (applications/services). A cluster master is an API or entry point for all (or a subset) of administrative tasks which users interact with and provide scheduling for containers (discussed below). The cluster master hosts control plane aspects of the cluster and is responsible for controlling and managing the worker nodes in a cluster. Based on user instructions, the cluster master will schedule and execute applications onto worker nodes. In one embodiment, to increase availability and full tolerance, a cluster will include at least three nodes and have an odd number of nodes.

Worker nodes provide resources for workloads specified by the cluster users and managed by the cluster master. Worker nodes are disposable in that they can be added to jobs and removed from jobs at the direction of the cluster master.

Global administrator 32 (see FIG. 1) manages clusters and serves as a platform for end users to manage multiple clusters and production. Global administrator 32 unites clusters under centralized authentication and access control. Global administrator 32 can be used to import existing clusters, deploy new clusters, add new nodes into existing clusters and remove existing nodes from clusters. Additionally, general administrator 32 can manage users and be the user for interface for managing and monitoring applications. Multi-mission software gets loaded onto all nodes of all clusters in order to manage and monitor applications, including deploy, update and remove applications as well as monitor health status and logs for applications.

Figure 5:
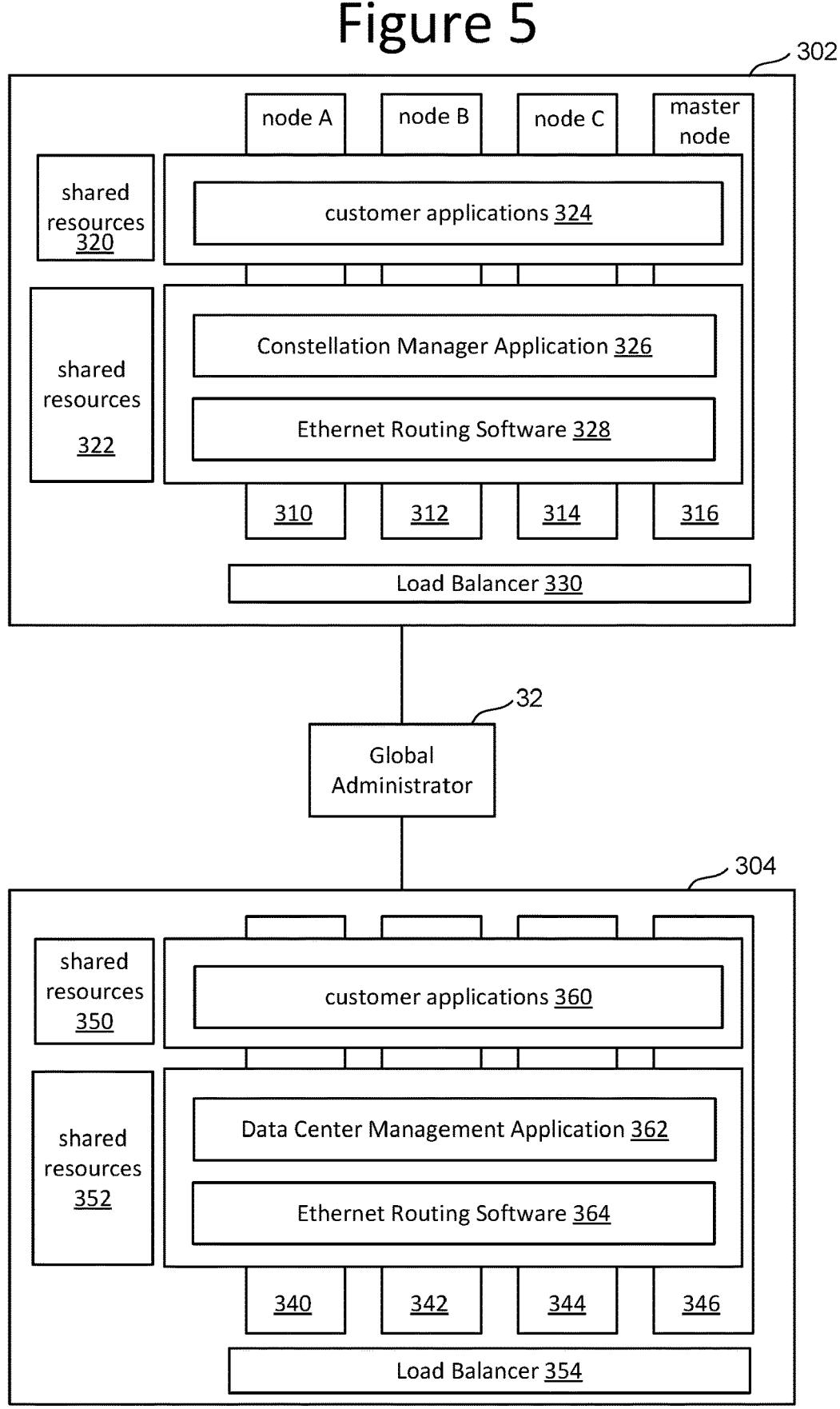
FIG. 5 is a logical block diagram of a multi-mission configurable spacecraft system.

FIG. 5 is a logical block diagram of a multi-mission configurable spacecraft system implemented using the components depicted in FIGS. 1-4. The example system depicted in FIG. 5 shows two example clusters 302 and 304, in communication with Global Administrator 32. Cluster 32 is a space-based cluster while cluster 304 is a ground-based cluster. In that regard, cluster 302 includes nodes 310, 312, 314 and 316, all of which are spacecraft (e.g., satellites or other types of spacecraft). Node 316 is the cluster master. Cluster 302 includes two of sets of shared resources 320 and 322. First shared resource 322 includes Constellation Manager Application 326 and Ethernet routing software 328. Constellation Manager Application 326 is software loaded on all nodes and is used to deploy, update or remove applications, and monitor application health, status and logs. Ethernet routing software 328 is used to facilitate communication between nodes. Shared resource 320 includes customer applications 324 (e.g., one or more software applications deployed across nodes 310, 312, 314 and 316). Load balancing software 330 is used to balance a load on each of the nodes and can run on cluster master 302, global administrator 332 or another node.

Ground-based cluster 304 includes nodes 340, 342, 344, and 346, all of which are ground-based computing devices (e.g., servers, PCs, laptops, etc.). In one embodiment, node 346 is the cluster master. Cluster 304 includes two sets of shared resources 350 and 352. Shared resources 352 includes Data Center Management Application 362 and Ethernet routing software 364. In one embodiment, Data Center Management Application 362 is used to deploy, update and remove applications from the various nodes of the ground-based cluster which are located in a data center. Ethernet routing software 364 provides communication services between nodes. Shared resources 350 includes one or more customer applications 360 that are deployed across nodes 340, 342, 344 and 346. Load balancing software 354 is used to balance the load among the nodes in cluster 304 running customer applications 360. Although FIG. 5 shows customer applications 324 running on the nodes of cluster 302 and customer application 360 running on the nodes of cluster 304, in one embodiment, a single software application (or multiple software applications) can be deployed across this set of satellites for the space-based cluster 302 and the set of ground-based computing nodes of ground-based cluster 304 concurrently while one or more other software applications can be deployed across a different set of satellites in a different cluster and a different set of ground nodes in a different cluster. Similarly, a single application can be deployed across nodes of space-based cluster 302 and ground-based cluster 304.

FIG. 5 is an example of a system that includes a plurality of satellites (310, 312, 314, 316) in orbit, where each satellite includes an antenna, a memory configured to store a non-virtualized operating system and one or more software applications, and a processor connected to the antenna and the memory. The processor is configured to run the non-virtualized operating system. The processor is configured to run one or more software applications (e.g., customer applications 324) such that the one or more software applications are in direct contact with the non-virtualized operating system without the one or more software applications being executed by a virtual operating system. This is being compared to a system where the processors run an operating system, and a virtual operating system is installed on top of the operating system such that the applications run in the virtualized operating system. The system in FIG. 5 also includes a plurality of ground-based computing nodes, where each ground-based computing node includes a memory configured to store one or more software applications in a processor connected to the memory. The processor is configured to run the one or more software applications.

In one embodiment, a user of this system can use Global Administrator 32 to send a new application to the appropriate cluster master (e.g., cluster master 316 and cluster master 346), which will then deploy the applications across the other nodes of their respective clusters and manage resources within the clusters. Cluster masters can be used to determine how much processing power, memory, non-volatile storage that each node will dedicate to running an application.

Figure 6:
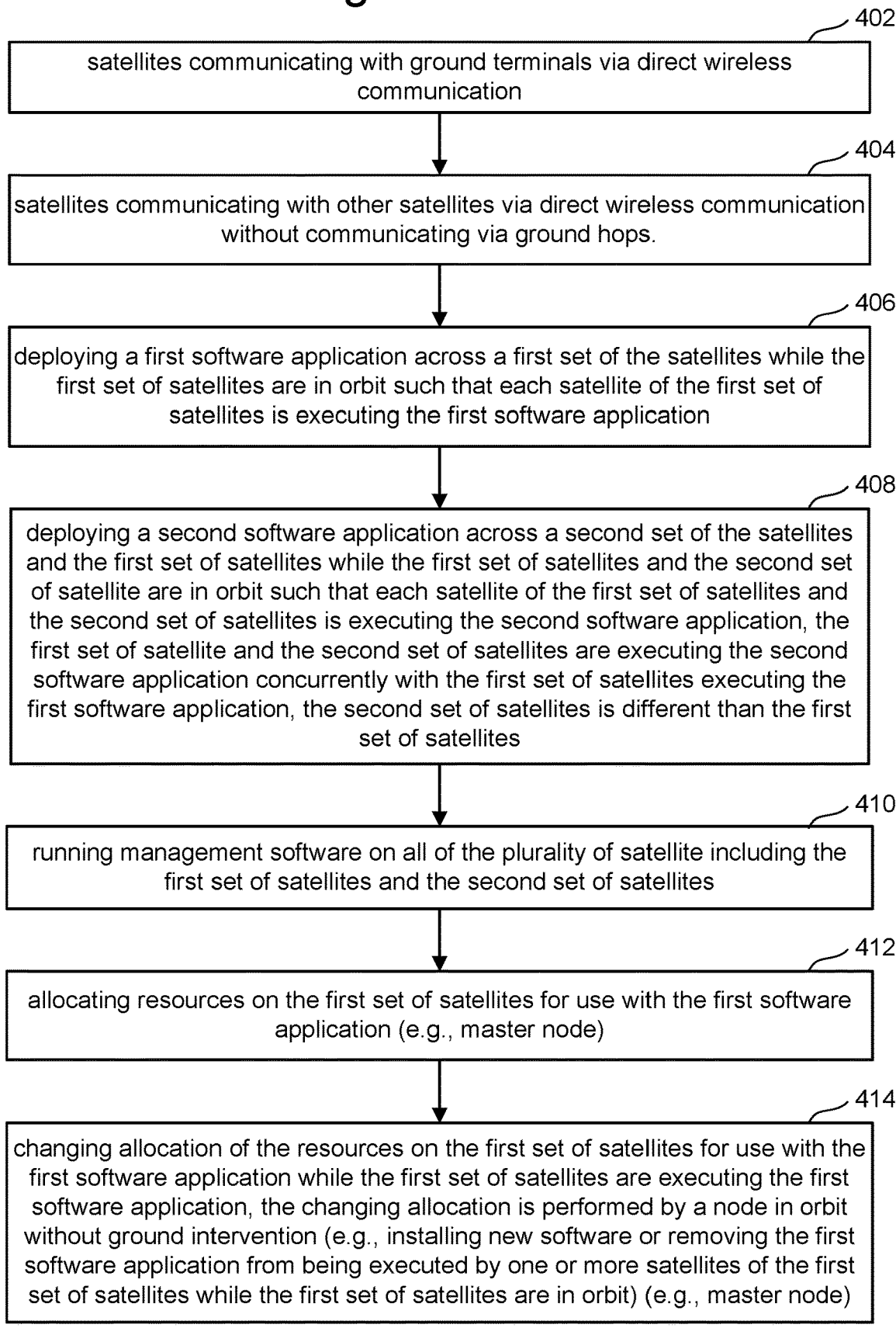
FIG. 6 is a flow chart describing one embodiment of a process for operating a multi-mission configurable spacecraft system.

FIG. 6 is a flowchart describing one embodiment of a process for operating the multi-mission configurable spacecraft system proposed herein. Step 402 comprises satellites (nodes and clusters) communicating with ground terminals (e.g., ground terminal 30) via direct wireless communication (e.g., RF communication or optical communication). Step 402 can also include satellite nodes communicating with ground-based computing nodes via ground terminals (through or around Global Administrator 32). Step 404 includes satellites nodes communicating with other satellites (other nodes) via direct wireless communication (e.g., RF communication or optical communication) without communicating via ground hops. This means that satellites can communicate with other satellites directly without first sending the communication signal to the ground and back up to a satellite. In one embodiment, step 402 and 404 are performed continuously or as needed, including before, during and after performance of the steps 406-414.

Step 406 of FIG. 6 includes deploying a first software application across a first set of the satellites while the first set of satellites are in orbit such that each satellite of the first set of satellites is executing the first software application. For example, the first set of satellites can include a cluster or multiple clusters of satellites (or other spacecraft). The software application can be for obtaining images, observing weather, providing navigation services, providing communication services, etc. No particular type of software application is required. Deploying a software application across a set of satellites allows a user to configure a set of satellites for a mission. Thus, when that mission is over, the satellites can be reconfigured for a different mission by removing the software application and/or deploying a different software application.

One or more additional software applications can be deployed concurrently with the first software application. For example, in step 408, a second software application is deployed across a second set of satellites and the first set of satellites while the first set of satellites and the second set of satellites are in orbit such that each satellite or the first set of satellites and the second set of satellites is executing the second software application. Executing the second software application can include executing the entire application or only a portion of the application. The first set of satellites and the second set of satellites are executing the second software application concurrently with the first set of satellites executing the first software application. The second set of satellites is different than the first of satellites (e.g., disjoint sets of satellites); for example, different clusters. Step 408 provides an example where a software application is deployed across a first cluster and a different software application is deployed across that first cluster and the second cluster. This shows how a constellation satellite can be configured according to the needs of users of different applications.

Step 410 includes running management software on all the satellites, including the first set of satellites and the second set of satellites mentioned above. For example, step 410 includes running Constellation Manager Application 326 and Ethernet routing software 328 of FIG. 5.

In step 412, resources are allocated on the first set of satellites for use with the first software application. Similarly, resources can be allocated for the first set of satellites and the second set of satellites for use with the second software application. For example, the cluster master (e.g., cluster master 316), can allocate the resources being use for customer application 324 being executed on nodes 310, 312 and 314. This allocating of resources can include allocating the amount of CPU usage, memory usage, non-volatile storage usage and communication bandwidth. In step 414, the cluster master can change the allocation of resources on the first set of satellites for use with the first software application while the first set of satellites are executing the first software application. That changing allocation is performed by a node in orbit without ground intervention. That is, the cluster master will change allocation without having to install new software or removing the first application from being executed. For example, the cluster master may change the CPU usage, memory usage, non-volatile storage usage and/or communication bandwidth based on orbit positions of the satellites, needs of the application, needs of other applications, health of the satellite, etc.

Note that the steps of FIG. 6 can be performed concurrently, rather than sequentially as depicted in FIG. 6, and can be performed in orders different that that depicted in FIG. 6.

Figure 7:
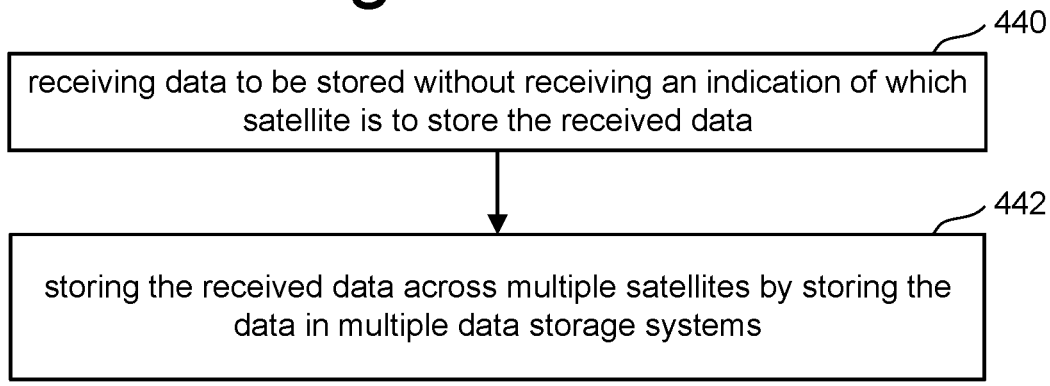
FIG. 7 is a flow chart describing one embodiment of a process for operating a multi-mission configurable spacecraft system.

FIG. 7 is a flow chart describing one embodiment of another process for operating the multi-mission configurable spacecraft system in relation to storing data. In one example embodiment, a constellation of satellites or a combination of satellites and/or ground-based computing nodes can be used to store data in a manner similar to a server farm or data cloud. That data stored in the satellites can be distributed among various satellites in the constellation for purposes of full tolerance, date availability, implementing a content-based network, etc. In step 440 of FIG. 7, data is received. That data is to be stored in one or more satellites. The data is received without receiving indication of which satellite to store the data. In one embodiment, the data is received at a cluster master for a cluster. Alternatively, the data is received at another space-based or ground-based node. In step 442, the data that was received in step 440 is stored across multiple satellites (or other spacecraft). In one embodiment, each satellite includes a data storage system (e.g., non-volatile storage 206 of FIG. 3). The cluster master will determine how to divide the data among the various storage systems for the various satellites of the cluster (or multiple clusters) based on load availability, health of the satellites, read/write cycles for the non-volatile storage, etc.

Figure 8:
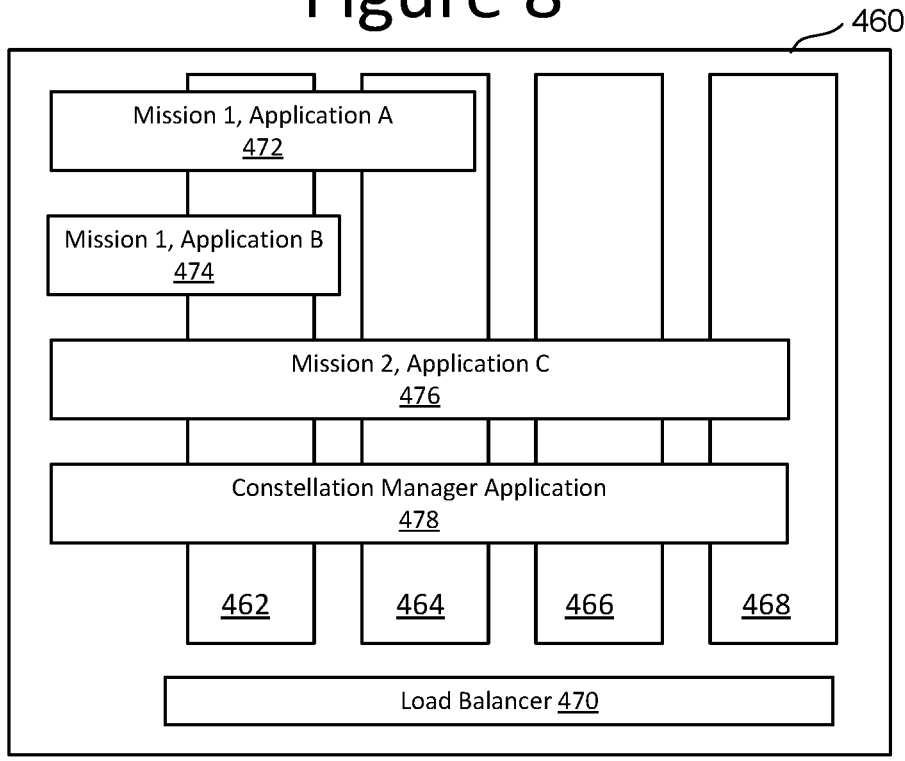
FIG. 8 is a logical block diagram of a multi-mission configurable spacecraft system.

FIG. 8 depicts an example of deployment of software across a cluster. It is envisioned that a constellation of satellites, and the multi-mission configurable spacecraft system will have multiple clusters; however, FIG. 8 only shows one example cluster of the multiple clusters. Cluster 460 includes four nodes 462, 464, 466 and 468. Any of those four nodes can be a cluster master. In other embodiments, a cluster can have more or less than four nodes. In one example, node 468 is the cluster master. In another embodiment, another node not depicted in FIG. 8 is the cluster master. Cluster 460 includes load balancer 470 which can be software running on the cluster master or another node to balance a load across the various nodes of the cluster. FIG. 8 shows application A (which is part of Mission 1) 472 deployed across node 462 and node 464. Application B (also part of Mission 1) 474 is deployed across nodes 462, but not across nodes 464-468. Application C (Mission 2) 476 is deployed across nodes 462, 464, 466 and 468. Constellation Manager Application 478 is deployed across all four nodes 462-468. Application A 472 and application B 474 are for the same mission. However, application A 472 and application B 474 are completely isolated in networking and resource usage. Application A consumes resources only from nodes 462 and 464. Application B consumes resources only from node 462. Application C is deployed across the entire constellation and, therefore, consumes resources from all nodes of the constellation. However, the amount of resources that application C uses may vary from node to node. Application C 476 is completely isolated in networking and resource usage from application A 472 and application B 474. Note that cluster 460 can be a space-based cluster or a ground-based cluster. If cluster 460 is a space-based cluster, then nodes 462, 464, 466 and 468 may be satellites (or other types of spacecraft).

FIG. 8 depicts example implementations of steps 406 and 408 of FIG. 6. In step 406, first software application is deployed across the first set of satellites. This can equate to deploying application A 472 across nodes 462 and 464. In step 408, a second software application is deployed across the first set of satellites and the second set of satellites. This can equate to the deployment of application C 476 across nodes 462, 464, 466 and 468.

Figure 9:
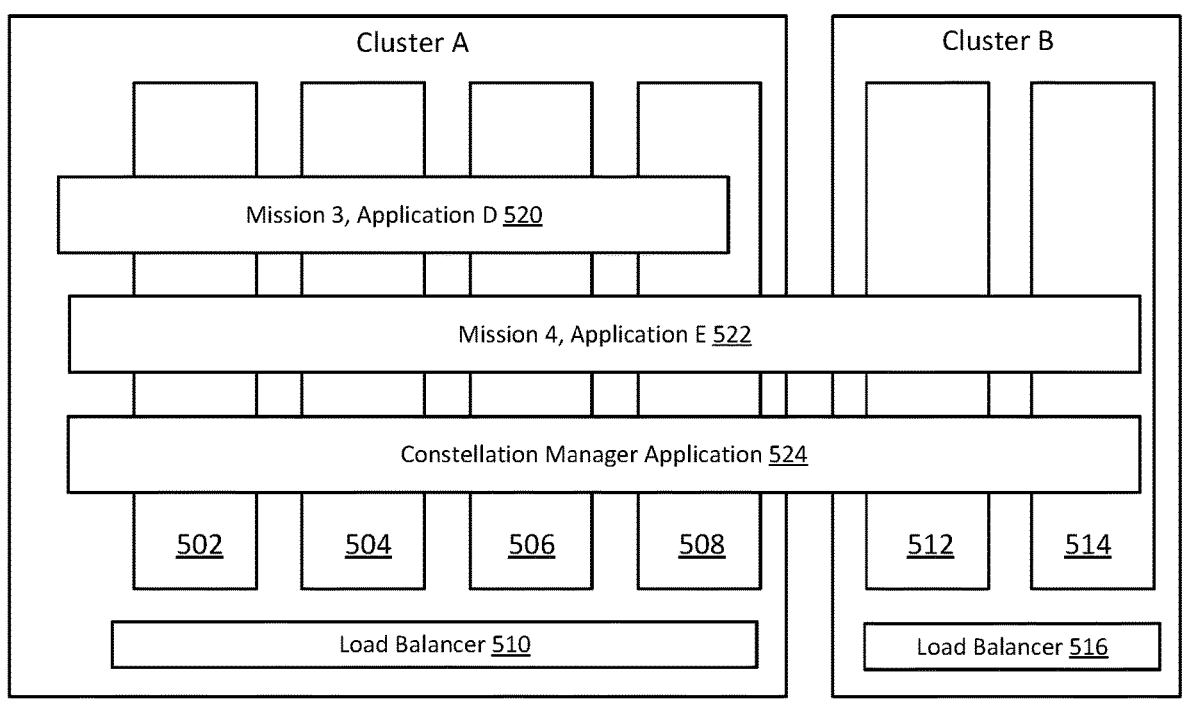
FIG. 9 is a logical block diagram of a multi-mission configurable spacecraft system.

FIG. 9 is a logical block diagram of another embodiment of the multi-mission configurable spacecraft system. FIG. 9 shows two clusters: cluster A and cluster B. Cluster A includes four nodes 502, 504, 506 and 508. Cluster A also includes load balancing software 510. Cluster B includes two nodes 512 and 514, as well as load balancing software 516. In other embodiments, cluster A and cluster B can include additional nodes. FIG. 9 shows application D 520 (for Mission 3) being deployed across nodes 502, 504, 506 and 508 of cluster A. Application E 522 (for Mission 4) is deployed across nodes 502, 504, 506, 508 of cluster A as well as nodes 512 and 514 of cluster B. Constellation Manager Application 524 is deployed across all nodes of the constellation. In this example, cluster A and cluster B are both space-based clusters; therefore, nodes 502, 504, 506, 508, 512 and 514 are satellites (or other spacecraft). In this example, application D 520 is completely isolated from application E 522 in terms of networking and resource (e.g., CPU, memory, storage, etc.) usage. FIG. 9 provides another example implementation in steps 406 and 408. The deploying the first software application across a first set of satellites can be equated with the deployment of application D 520 across nodes 502, 504, 506 and 508; while the deployment of the second software application across the first and second set of satellites equates to deployment of application E 522 across nodes of the first set of satellites (nodes 502, 504, 506 and 508) and the second set of satellites (nodes 512 and 514).

Figure 9A:
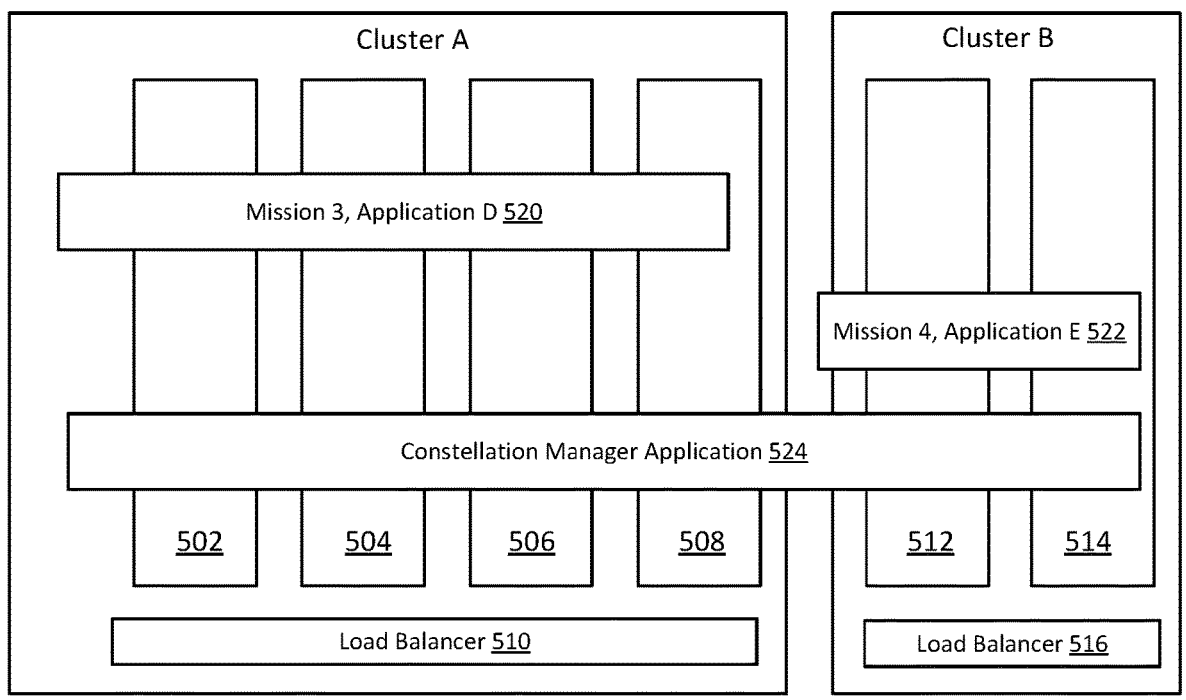
FIG. 9A is a logical block diagram of a multi-mission configurable spacecraft system.

FIG. 9A is a logical block diagram depicting the multi-mission configurable spacecraft system of FIG. 9. However, FIG. 9A shows application E 522 deployed across nodes 512 and 514 (and not deployed across nodes 502-508). For example, perhaps in step 414 of FIG. 6, the system changes allocation of resources for application E 522 so that application E 522 is only being executed by nodes 512 and 514.

The embodiment depicted in FIG. 9A is an example of deploying a first software application (e.g., application D 520) across a first set of the spacecrafts while the first set of spacecrafts are in orbit such that each spacecraft of the first set of spacecrafts (e.g., nodes 502, 504, 506, 508) and deploying a second software application (e.g., application E 522) across a second set of the spacecrafts (e.g., 512, 514) while the second set of spacecraft are in orbit such that each spacecraft of the second set of spacecrafts is executing the second software application. Note that in one example implementations, application D 520 and application E 522 are run directly by a non-virtual operating system (e.g., not by a virtual operating system).

Figure 10:
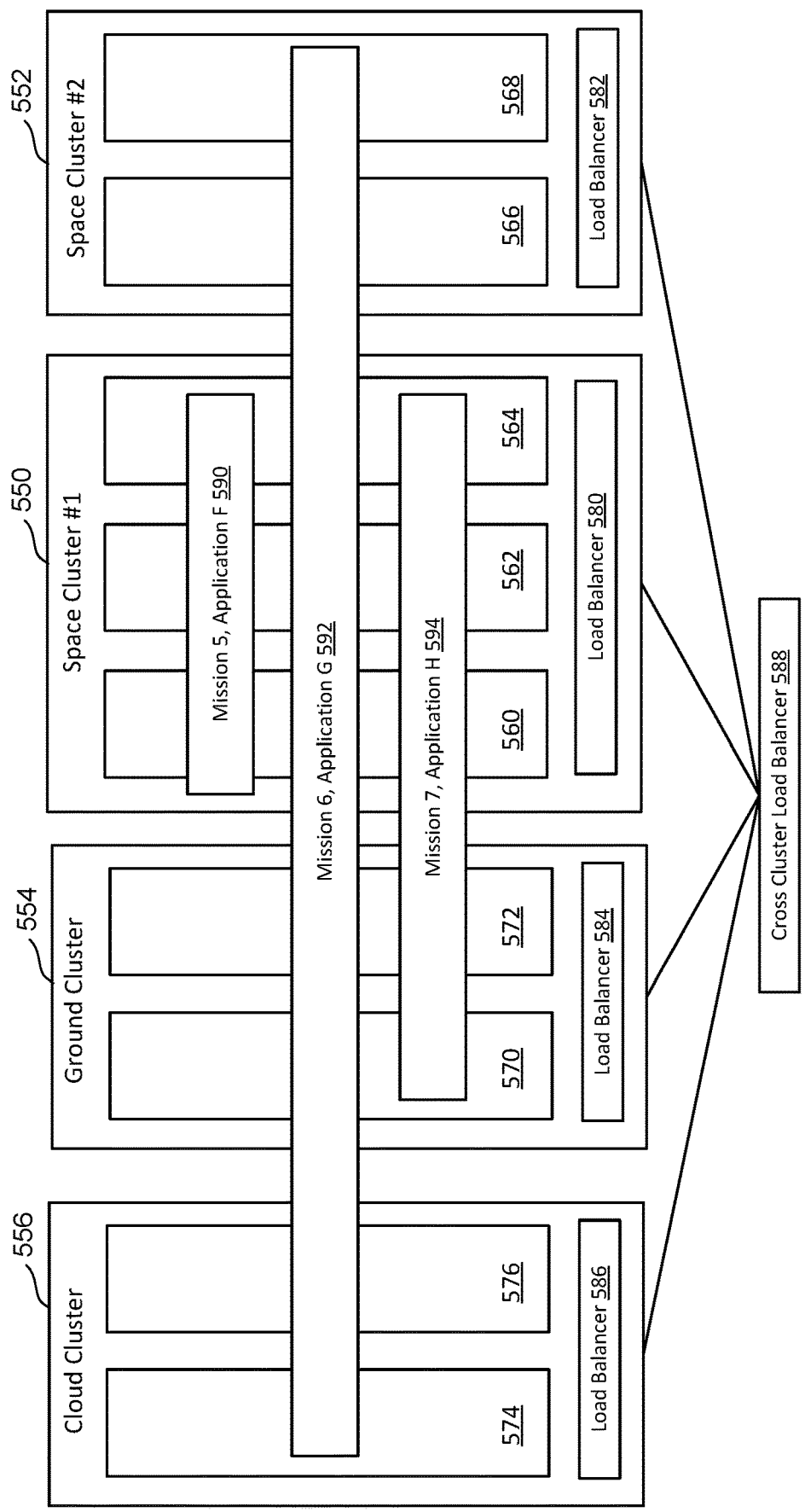
FIG. 10 is a logical block diagram of a multi-mission configurable spacecraft system.

FIG. 10 is a logical block diagram of another example implementation of the multi-mission configurable spacecraft system. FIG. 10 shows four clusters 550, 552, 554 and 556. Cluster 550 is a space-based cluster (Space Cluster #1). Cluster 552 is a second space-based cluster (Space Cluster #2). Cluster 554 is a ground-based cluster. Cluster 556 is a cloud-based cluster. A cloud based cluster is a set of nodes that exist as part of the cloud computing platform. Cluster 550 includes nodes 560, 562 and 564, all of which are satellites. However, other spacecraft can also be used. Cluster 552 includes nodes 566 and 568, both of which are satellites. Cluster 554 includes ground-based computing nodes 570 and 572. Cluster 556 includes computing nodes 574 and 576, both of which are likely to be servers in a computer farm. Other embodiments can utilize more nodes than depicted in FIG. 10. Cluster 550 includes load balancer 580 for balancing load among nodes within cluster 550, cluster 552 includes load balancer 582 for balancing load among nodes within cluster 552, cluster 554 includes load balancer 584 for balancing load among nodes within cluster 554, and cluster 556 includes load balancer 586 for balancing load among nodes within cluster 556. FIG. 10 also shows a cross-cluster load balancer 588 in communication with each of the clusters (including in communication with each of the load balancers 580-586) in order to provide load balancing across/between clusters. Thus, if one cluster is overloaded computing and/or data can be moved from one cluster to another to make unused resources are available to the mission.

FIG. 10 shows application F 590 (which is part of Mission 5) deployed across satellites/nodes 560, 562 and 564 concurrently with application G 592 (Mission 6) deployed across all the nodes (560, 562, 564, 566, 568, 570, 572, 574 and 576) of all the clusters (550, 552, 554 and 556). FIG. 10 also shows application H 594 (of Mission 7) deployed across nodes 560, 562 and 564 of cluster 550 (space-based cluster) as well as nodes 570 and 572 of cluster 554 (ground-based cluster). Thus, FIG. 10 shows an example where a first software application (e.g., application G 592 or application H 594) are deployed across the first set of satellites and a first set of ground-based computing nodes concurrently while a second software application (application F 590) is deployed across a first set of satellites.

In one embodiment, each cluster of nodes can be owned by different entities or partially owned by multiple entitles. Each of the nodes can be next generation spacecraft or refurbished old spacecraft that are being repurposed for new missions. Often a spacecraft completes its mission before the lifetime of the spacecraft has completed therefore, the spacecraft is available to be part of a cluster to perform work for other missions in the multi-mission configurable spacecraft system by having different clusters of satellites in different orbits provides high resiliency through multiple availability zones, with database replication across multiple regions. The constellation divided into clusters allows for expansion of computer resources from existing or temporal clusters. The multi-mission configurable spacecraft system can manage applications across any environment including but not exclusive to space nodes, ground nodes and cloud nodes, as depicted in FIG. 10. Additionally, the system can support many different processor architectures, including ARM v7, ARM 64, x86, and x64, as well as others.

An application can comprise one or more micro services. Each micro service consists of the following components: container, configurations, secrets, service, ingress, persistence and hardware acceleration. A container is a lightweight standard unit of software that packages up executable code and all its dependencies. Configurations are non-sensitive configuration files, command line arguments, environment variables, port numbers and other configuration artifacts. Decoupling configurations from containers allows portability and makes it easier to change, manage, store and share applications. Secrets are sensitive data such as tokens, keys, user names and passwords. Secrets cannot be stored in open text format, and need secure means for storage. Services enable container network connectivity that work uniformly within/across nodes in clusters. A container can be deployed on any node within a cluster. Ingress includes writing rules that defines how external users access a micro service. Persistence includes volume, database and a cache. Volume is a file storage for raw imagery, raw sensor data recordings, etc. There is a need to provide distributive file/block-based storage replication for backups and stored snapshots. A database stores micro services data and requires high availability as well as resilience. A cache allows for quick access to often used data. Hardware acceleration is required for massive parallel processing for purposes such as artificial intelligence, image recognition, complex algorithms, etc. Hardware accelerators can include an FPGU or a GPU.

Manual deploying and managing applications of potentially thousands of nodes across different environments is difficult. The multi-mission configurable spacecraft system described herein solves this problem. Write deployment manifest to declaratively instruct the system how to create and update instances of applications. The cluster masters then deploy a specified number of application instances onto available nodes. Once deployed, the system continuously monitors those instances. If a node that is served in the app instance goes down or is deleted, the system automatically replaces the instance onto another node (referred to as self-healing).

Applications are deployed using several deployment entry points, deployment methods and deployment types. Examples of deployment entry points include the global administrator web UI, global administrator command line interface, global administrator API, a cluster node command line interface, cluster node API, and/or cluster master command line interface. Deployment methods could include manual deployment and/or manifest deployment. The deployment types include standard deployment, scheduled deployment, priority driven deployment, continuous integration/continuous delivery, ("CICD") and rule-based deployment.

Upon receiving deployment instructions, a cluster master automatically deploys and monitors the applications without any external connectivity. Global Administrator 32 provides a user interface to deploy apps, but a develop can connect directly to either the cluster master or a particular node to upload deployment instructions either through an API or a command line interface.

In regard to a manual application deployment method, a developer or operator manually deploys the individual micro service components. In regard to a manifest application method, developers and operators package, configure and deploy complex applications and service with some automation and help from the system. Manifest deployment includes a set of instructions and source code reference to all the application micro services and individual components. File formatted as a YANL human readable data serialization language is used to automate deployment. With a complete manifest, an application can be deployed with ease and with high reproducibility. In a user defined deployment, the system will deploy an application to one or more custom labeled nodes and/or to nodes that have specific specifications (e.g., SSD, notice with GPU, etc.). The system will automatically determine which nodes to deploy into. A cluster master may calculate the best candidate node including without limiting to the following criteria: does the node exist and is the node healthy, does the node have necessary resources, does the node already have the container image aboard, are the containers within the same service distributed evenly across the cluster. The system may also use a round robin strategy if there is more than one node with the same score. In a schedule type of deployment, application service deployments can be scheduled under predetermined date and time, offset duration from a configured point in time, or in a predetermined interval. In a priority driven deployment, priority indicates the importance of a container relative to other containers such that priorities can be used to preempt another container in case clusters compute resources usages at its peak. Preemption entails removal of the low priority container from the memory. This provides high level deployment confidence for critical applications. In CIDC deployment, the system provides custom logic that can be applied to finding the best node for the container. Some use cases include dedicating nodes to specific users; accommodating dynamically changing nodes based on business rules; and deployment rules input from an external source.

Figure 11:
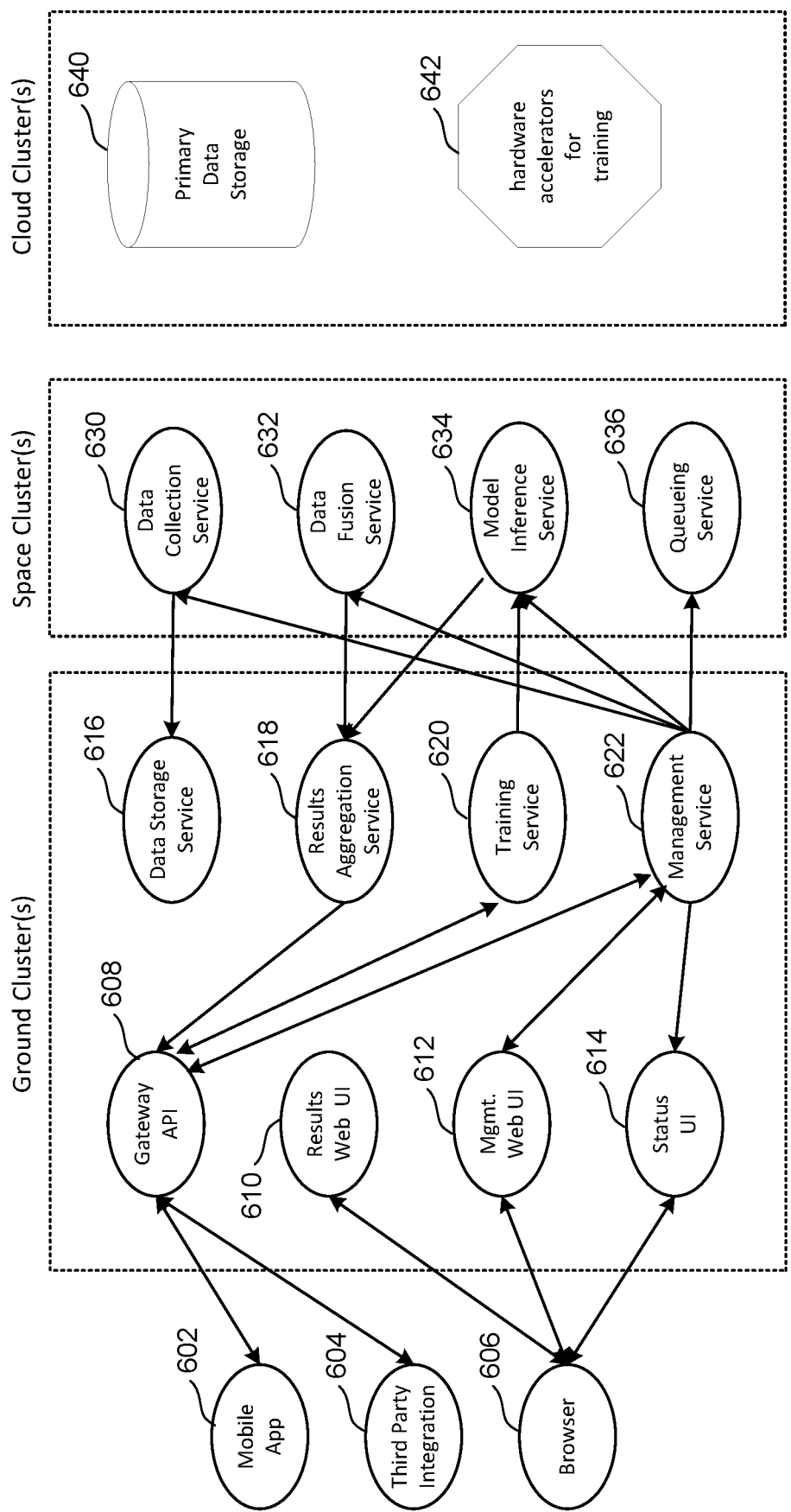
FIG. 11 is a logical block diagram of an example application architecture for the multi-mission configurable spacecraft system.

FIG. 11 is a logical block diagram in an example application architecture for the multi-mission configurable spacecraft system. FIG. 11 shows a set of end users, including mobile application 602, third party integration 604 and a browser (on a user's computer) 606, all three of which are communication with a gateway API 608. The example in FIG. 11 includes a set of software components assigned to one or more ground clusters, a set of software components assigned to one or more space clusters, and a set of software components assigned to one or more cloud clusters. The software components assigned to the ground clusters include the gateway API 608, results web UI 610, a management web UI 612, status UI 614, data storage service 616, results aggregation service 618, training service 620, and management service 622. The software components assigned to one or more space clusters include a data collection service 630, data fusion service 632, model inference service 634, and queuing service 636. In the example in FIG. 11, the cloud clusters implement a primary data storage 640 and hardware accelerators for training 642. In one example, the system illustrated in FIG. 11 is implementing an artificial intelligence system for training and using a classifier model for big data applications. That data is stored in primary data storage 640. Data is collected by data collection service 630 and provided to data storage service 616 on the ground, which is in communication with primary data storage service 640. For example, data collection service 630 can be imager sensors (e.g., cameras) on satellites. Data fusion service 632 is use to combine data intelligently on the satellites. Model inference service 634 provides inferences to be used to create, train or update classifier models, the results of which are provide to results aggregation service 618 (which also receives data from data fusion service 632).

Figure 12:
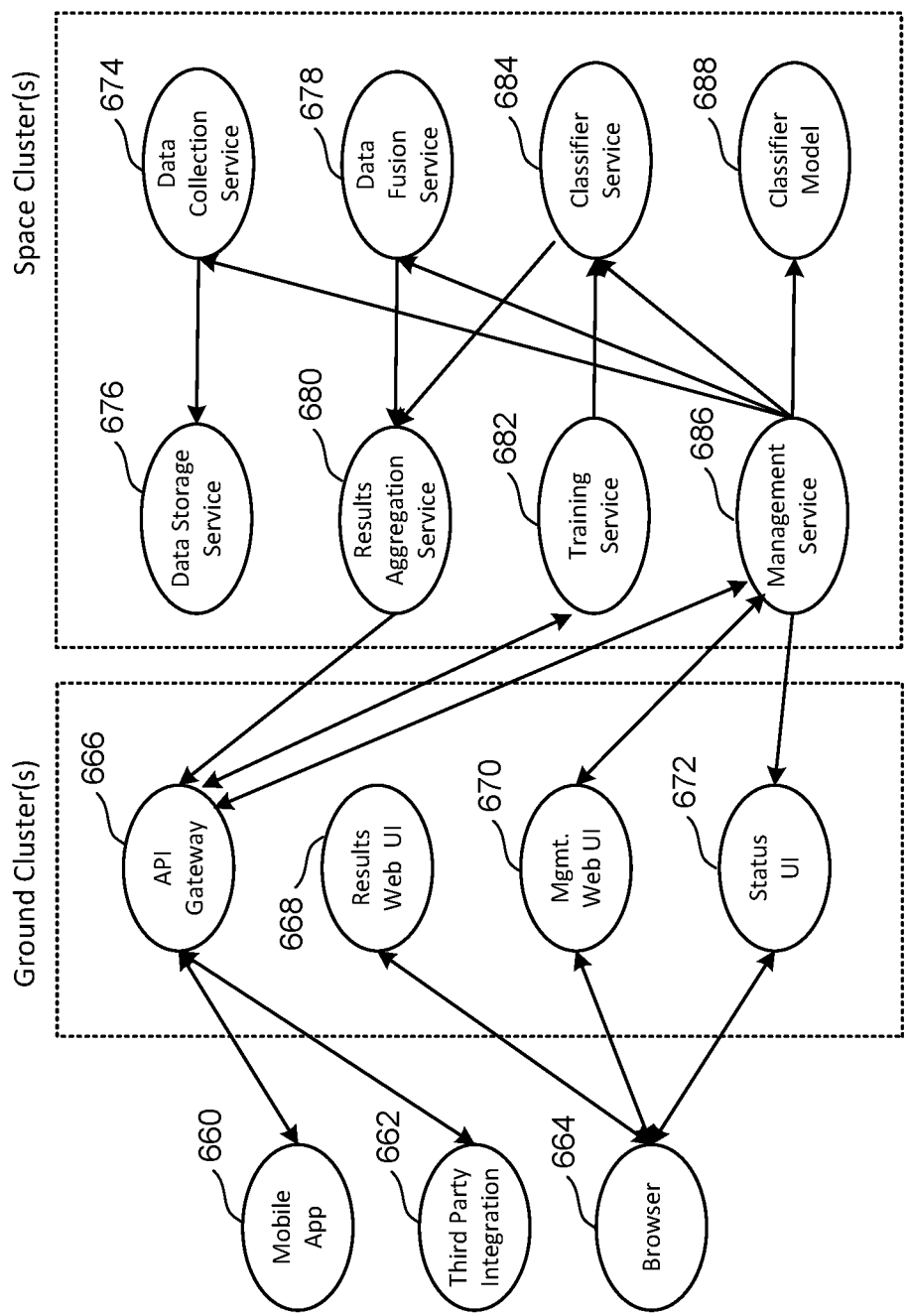
FIG. 12 is a logical block diagram of an example application architecture for the multi-mission configurable spacecraft system.

FIG. 12 is a logical block diagram of another example of application architecture for the multi-mission configurable spacecraft system. In the embodiment of FIG. 12, no cloud clusters are used, and more resources are used on the space clusters rather than ground clusters. For example, end users mobile app 660, third party integration 662 and browser 664 are depicted in communication with gateway API 666, results web UI 668, management web UI 670 and status UI 672 in the ground clusters. In this example, the interface to the system for the end users are provided by the ground clusters; however, the data storage and processing is performed by the space clusters. For example, the space clusters implement data collection service 674, data storage service 676, data fusion service, 678, results aggregation service 680, trading service 682, classifier service 684, management service 686 and cluster model 688. In one example implementation, the system of FIG. 12 implements an artificial intelligence system for classifying big data using a trainable classifier model.

Figure 13:
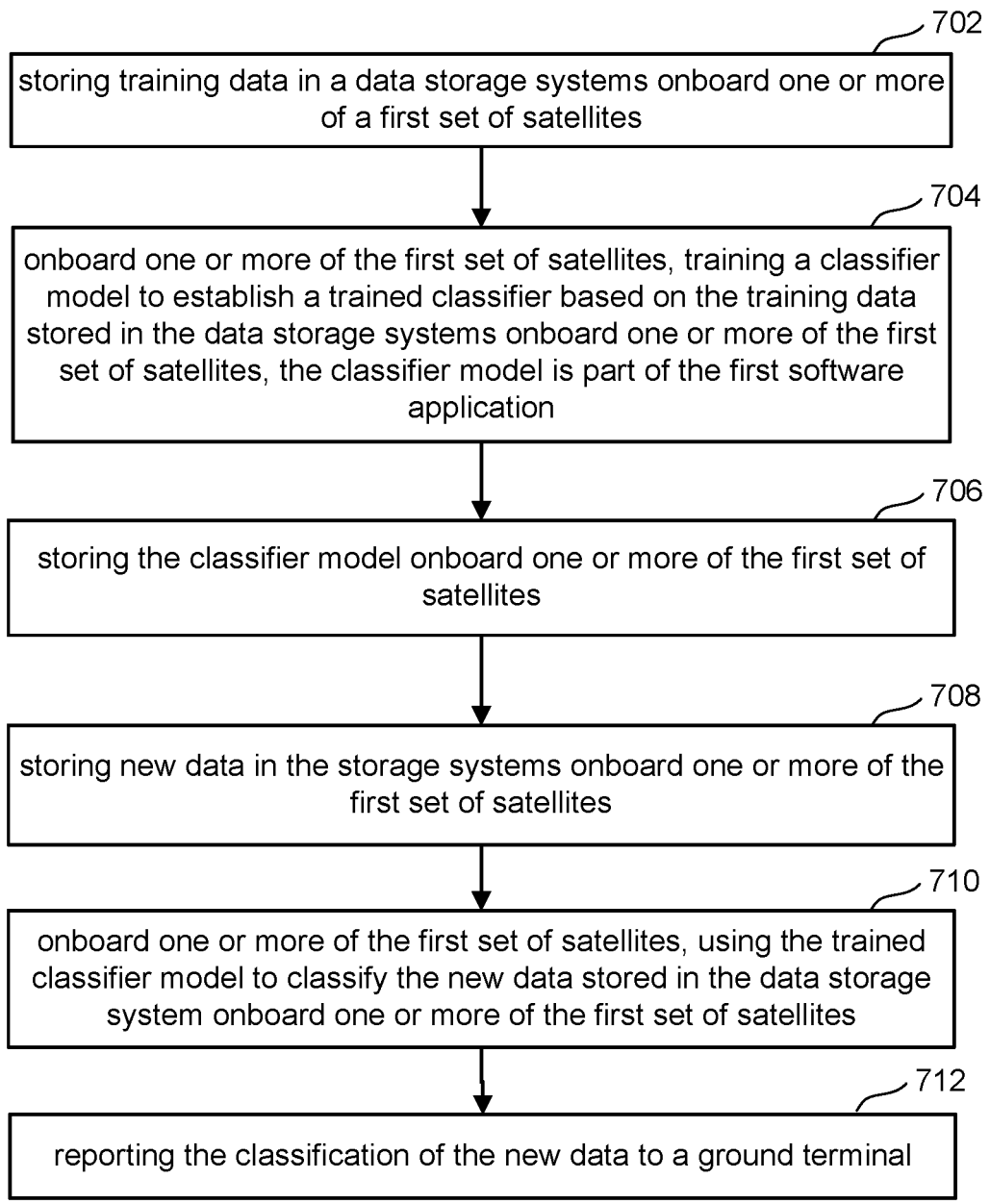
FIG. 13 is a flow chart describing one embodiment of a process for operating a multi-mission configurable spacecraft system.

An example of a process for operating the multi-mission configurable space system with artificial intelligence software based on a trainable classifier model is described with respect to FIG. 13. The process of FIG. 13 can be used with the example application architecture depicted in FIG. 12 and the components describe above with respect to FIGS. 1-5, 8, 9 and/or 10. In step 702 of FIG. 13, system stores training data in a data storage system on board one or more of the first set of satellites. The first set of satellites can be the nodes of a cluster or the nodes of multiple clusters. The data storage system can be non-volatile memory on one node or across multiple nodes. In step 704, on board one or more of the first set of satellites, a classifier model is trained to establish a trained classifier based on the training data stored in the data storage system on board one or more of the first set of satellites. The classifier model is part of the first software application describe above. With respect to FIG. 12, classifier model 688 is what is being trained in step 704. This training is performed on space-based nodes (e.g., the training is performed by an application deployed across one or more satellites). In step 706, the classifier model that was trained in step 704 is stored on board one or more of the first set of satellites. In step 708, new data is stored in the storage systems on board one or more of the first set of satellites. The new data could be data from sensors on board the satellites or from the ground. For example, one or more of the satellites may be taking images of Earth, gathering weather data, gathering communication statistics, etc. The new data is stored on space-based nodes. In step 710, on board one or more of the first set of satellites, the trained classifier model is used to classify the new data stored in the data storage system on board one or more of the first set of satellites. In step 712, the results of the classification is reported to a ground terminal. Thus, the process in FIG. 13 describes a system where data is stored in the space-based clusters and processed in the space-based clusters. The results of the processing can be sent to the ground or remain in space.

In one embodiment, the software that is deployed across the satellites in ground-based computing nodes are implemented in containers. A container is a standard unit of software that patches up code and all its dependencies so the applications run quickly and reliably from one container environment to another. Thus, a container image is a lightweight, standalone, executable package of software that includes everything needed to run an application: code, run time, system tools, system libraries and settings. Container images become containers at run time.

Containers solve a critical issue in the life of application development. When developers are writing code, they are working on their own local development environment. When they are ready to move that code to production, this is where problems arise. The code that worked perfectly on their machine does not work in production. The reasons for this are varied: different operating systems, different dependencies, different libraries, etc. Containers solve this critical issue of portability allowing the separation of code from the underlying infrastructure it is running on. Developers could package up their application including all the bins and libraries it needs to run correctly, into a small container image. In production, that container can be run on any computer that has a containerized platform. Thus, containers are portable and scalable. In addition to solving the major challenge of portability, containers and container platforms provide many advantages over traditional virtualization. Containers have an extremely small footprint. The containers just needs its application and a definition of all the bins and libraries it requires to run. Unlike virtual machines, which each have a complete copy of a guest operating system, container isolation is done on the kernel level of the operating system without the need for a guest operating system. Thus, the software application is said to be running on bare metal or directly running on the primary operating system without running on a virtual operating system (and without there even being a virtual operating system). In addition, libraries can be cross containers, so it eliminates the need to have multiple copies of the same library on a server further saving space. Allotting for applications to become encapsulated in self-contained environments allows for quicker deployment, closer parity between developing environments and infinite scalability.

Docker is one example of a container platform. Docker engine is the run time that allows an entity to build and run containers. Before a Docker container is run, it must be built, starting with a Docker file. The Docker file defines everything needed to run the image including the OS network specifications and the file locations. Once there is a Docker file, a Docker image can be built. The Docker Image is the portable, static component that gets run on the Docker engine.

While Docker provides an open standard for packaging and distributing containerized applications, there is an issue of how all the containers in a system can be coordinated and scheduled. For example, how is an application seamlessly upgraded without any interruption of service. One example for orchestrating containers is Kubernetes, which is a container orchestrator. Kubernetes can be loaded as a control loop. A developer declares how they want the system to look and Kubernetes can make that be implemented. In general, Kubernetes compares the desired state to the actual state and if they are not the same it takes steps to correct that. Thus, Kubernetes can be thought of as software running a control loop.

Figure 14:
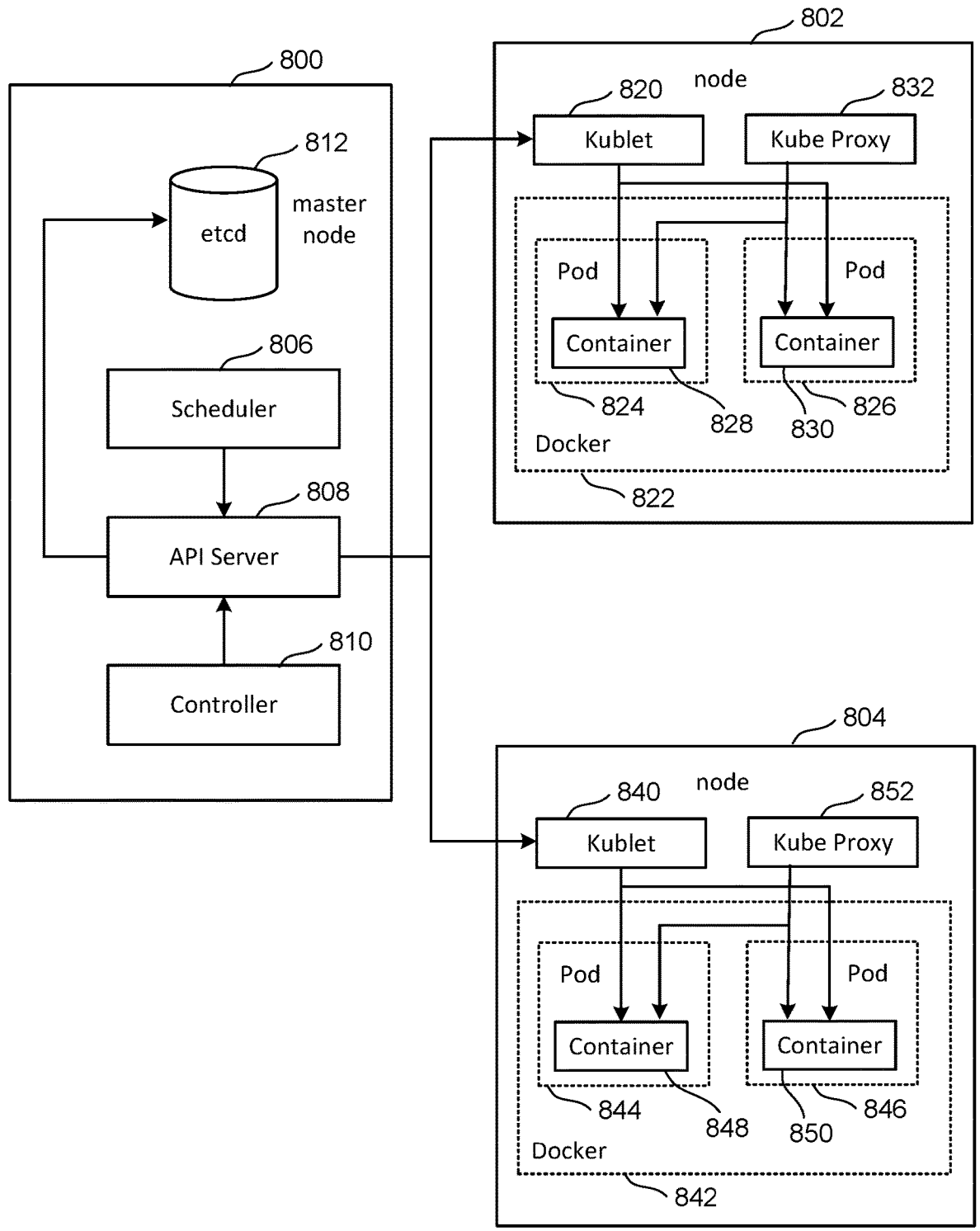
FIG. 14 depicts an example implementation of a portion of the multi-mission configurable spacecraft system.

FIG. 14 provides one example implementation of the system described above that makes use of containers. Docker and Kubernetes. In one example implementation, each of the software applications are Dockers containers and each node is a Kubernetes node in a Kubernetes cluster. In one embodiment, the ground-based computing nodes are implemented in Kubernetes [KAS] clusters and the spaced-based satellite nodes are implemented as lightweight Kubernetes [K3S] clusters. Additionally, Global Administrator 32 (see FIG. 1) can be implemented using Rancher software, which is a well-known container management platform that makes it easy to deploy and manage containered and Docker containerized applications onto Kubernetes in production on any infrastructure.

FIG. 14 is a block diagram describing one example implementation based on using containers implemented with Docker and Kubernetes. FIG. 14 shows a cluster master 800 in communication with two worker nodes 802 and 804. Cluster master 800 can be any of the cluster masters discussed above for a space-based or ground-based cluster. When cluster master 800 is a cluster master for a space-based cluster, the cluster master 800 is implemented on a satellite, worker node 802 is implemented on another satellite in the same cluster, and worker node 804 is implemented on another satellite in the same cluster. In such an embodiment, the deploying of a software application across a set of satellites includes the set of satellites executing the software application in a container that is in direct contact with a non-virtual operating system. This means that there's no virtual machine or virtual operating system sitting between the kernel operating system and the application. In another example, cluster master 800 can be in a ground based computing system for a ground-based cluster that includes ground-based worker node 802 and ground-based worker node 804. In such a ground-based environment, the deploying of software applications across a plurality of ground-based computing nodes includes the ground-based computing nodes executing the software application in direct contact with a non-virtual operating system.

Cluster master 800 includes scheduler 806, API server 808, controller 810 and etcd data store 812. Scheduler 806 and controller 810 both communicate with API server 808. API server 808 provides data to etcd data store 812 and communicates with nodes 802 and 804. API server 808 provides for communication between the components depicted in FIG. 14. Scheduler 806 decides which node pods should run on. Controller manager 810 is responsible for checking the current state against the desired state.

Pods are the lowest level resource in a Kubernetes cluster. A pod is made up of one or more containers, but often just a single container. When defining a cluster, limits are set for pods which define what resources, CPU and memory they need to run. Scheduler 806 uses this definition to decide in which nodes to place the pods. FIG. 14 shows node 802 having pod 824 and pod 826. Pod 824 includes container 828. Pod 826 includes container 830. Similarly, FIG. 14 shows node 804 including pod 844 and pod 846. Pod 844 includes container 848 and pod 846 includes container 850. Node 802 also includes Kublet 820, Docker run time 822 for containing the pods and containers, and a Kube proxy 832. Similarly, node 804 includes Kublet 840, Docker run time 842 and Kube Proxy 852. Kublets 820 and 840 are responsible for maintaining the set of pods which are comprises of one or more containers on the local system. Within a Kubernetes cluster, the Kublet functions as a local agent that watches for pod specs via the API server 808. Kube Proxies 832 and 852 are network proxies that run on each of the respective nodes 802 and 804 in the clusters. Kube Proxies implement part of the Kubernetes service concept by maintaining network rules on these nodes. These network rules allow network communication to the pods from the network sessions inside or outside of their respective cluster.

A satellite or other spacecraft implementing nodes 802 and/or 804 may include an antenna; a memory configured to store non-virtualized operating system and one or more software applications packaged as one or more containers; and a processor connected to the antenna and the memory. The processor is configured to run the non-virtualized operating system. The processor is also configured to run the one or more software applications in the one or more containers such that the software applications in the containers are in direct contact with the non-virtualized operating system without the software applications being executed by a virtual operating system. Thus, if the operating system for the satellite is Linux, then the software application will be executed directly by the Linux OS rather than a virtual operating system and/or virtual machine. The processor is configured to wirelessly communicate with cluster master 800 to receive instructions for executing the software application in the container. The architecture depicted in FIG. 14 can be implemented on the various satellites depicted in FIGS. 1, 2, 3, 5, 8, 9 and 10.

The system is equipped with the service mesh that helps orchestrate, secure and collect telemetry across distributed applications. In addition, the system can transparently oversee and monitor all application traffic. Monitoring software sits alongside each micro service as network proxies. The architecture discussed above decouples applications from the network, allowing operations and development teams to work independently. The system supports the following without any changes to application code: end-to-end encryption between services; granular traffic and authorization policies; automatically tries, back off and circuit breaking; service discovery and routing; and unified metrics.

Micro services are fronted with a proxy, data plane. All network communicate between micro services go through the proxy and into the control plane for processing. Addressing to any micro services contained and fixed with the proxy and any changes to the development of the recipient micro services will automatically get updated.

The system automatically provides end-to-end security. Network communications are automatically encrypted and decrypted between micro services, which removes the burden from application developers. Also there is strong service authentication: ensuring services with sensitive data can only be accessed from strongly authenticated and authorized clients; and allowing communication, security enforcement and traceability with the ability to prove it cryptographically. Access control is rule-based. Additionally, there is key management provided by Global Administrator 32. This automates delivery of certificates and keys to services, proxies can use keys to encrypt the traffic, provide a mutual TLS, periodically certificates are rotated to reduce exposure to compromise and can use TLS to prevent man in the middle attacks. Policy can be enforced at the application level, which is network layer 7. The system can enforce rate limits including defensive measures of services and protecting shared services from excessive use to maintain service availability. White lists and black lists can be set up to keep unsafe traffic out, and ensure that only micro services that are supposed to talk to each other are talking to each other. An application white policy can be enabled from encryption for all micro services interaction. Additionally, a standard expression language is used to declare policy constraints on the worker service behavior.

Space service mesh provides many automated capabilities for ensuring service resilience within applications without requiring any code changes. For example, time amounts are implement. The system can be configured to wait only N seconds for a response. This is critical to making systems resilient and available. Unbound latency uses resources, causes other systems to potentially wait, and is usually contributed to cascading failures. Additionally, retries are managed. The system can configure an N number of tries before having to deal with an error. A network may not be reliable and it may experience transient, intermittent errors, especially in distributed applications that span across more than one note. A circuit breaker can be implemented such that instead of overwhelming the degraded service, automatically open the circuit and rejects further requests.

The space service mesh also includes observability. In one embodiment, micro services network communications go through a proxy. This provides full traceability to allow trouble shooting and auditability. The control plane is able to gather logs and metrics, or can give deep insights about a network communication. Cluster masters and/or the global administrator can provide logging service including storing, searching, analyzing, monitoring and alerting on log data and events produced by micro services. There is also distributed tracing. An application can have micro services that span across more than one space node communicating with each other. This provides full picture of the whole call stack through the entire application with detailed information on service topologies, and network latencies and individual request durations. Additionally custom application matrix can be collect which enables granular insights into even customer facing issues. Metrics can be visually charted with customer alerts, etc. The system can also employ cluster federation. A global DNS enables globally accessible name end points for easier means of communication regardless of which cluster the micro services resides on. Applications can become highly available as it allows one application to run on different clusters. If one cluster fails, the global DNS would automatically reroute traffic to an alternative cluster.

An application in one cluster is a single point of failure. By deploying it into multiple clusters, applications stay healthy even if a provider or region goes down. If one cluster fails, applications seamlessly migrate to other clusters and recover from the entire regional outage. Additionally, hardware/software upgrades on a single cluster at a time doesn't affect the applications.

The system is a central control point for multiple clusters of constellations, allowing easier auditing and policy enforcement. Mission applications may be required to be deployed to specific constellations due to political reasons. Corresponding application data may have a requirement to be stored or processed in specific constellations. Specialized hardware may be restricted to only a few select users.

With access to multiple cluster resources at a time, operators can better avoid capacity overflow. Moving applications between different clusters is much easier and should not require any code or application configuration changes. This allows the operator to make more intelligent capacity loading decisions based on utilization, cost, performance, etc. The system continuously monitors all applications' health. The system can automatically detect if a micro service execution has crashed. Additionally, the system can periodically execute custom defined liveness and readiness probes. If a condition is not met, the system kills the container and if a restart policy is set, it immediately recreates a new instance of the container or application. If an entire space node fails, the system will automatically create new instances of the applications on another healthy node.

New software versions need to be rolled out, without disrupting active users. Rolling updates allow deployment updates to take place with zero down time by incrementally updating container instances with new ones and keeping at least one or more instances up and running and any point in time. The system monitors the service's readiness probe to ensure it is ready to take on requests before terminating the older service.

In general, the system provides common architecture from multiple organizations or tendency to manage applications that have compute resource and network isolation. In regard to network isolation, this ensures security vulnerability or breach when one enclave does not spill over to another. Each organization or team could own one or more enclaves to provide isolation between applications. Additionally, the network is isolated between enclaves, but network policies could allow cross communication. Operators are allowed to set compute resource quarters and how much CPU, storage, memory and accelerator resources can be consumed by enclave owners. Enclave owners can also set a course for individual containers given the resources that were allotted to them.

One beneficial use of the architecture in the system described herein is that the system can recover from radiation events. Radiation can damage electronics onboard spacecraft. When there is a solar flare or a coronal mass ejection occurring, large amounts of high energy protons are released, often in the direction of Earth. These high energy protons can easily reach the Earth's poles and can temporarily harm the operation of spacecraft. There are radiation conditions that can occur that require processor nodes to be powered down to avoid damage and/or failure. When these conditions occur, the system described above will reallocate work from that node that has its processor powered down to other nodes that were not affected by the radiation. When the radiation event is over, the affected node can be restarted, thereby, making it available for work. At that point the workload can autonomously be rebalanced to include that node.

FIG. 15 is a flowchart describing one embodiment of a process for the system recovering from radiation events. The process of FIG. 15 is performed by any of the embodiments discussed above, including those discussed in FIGS. 1, 2, 3, 4, 5, 8, 9, 10, 11, 12 and 14. In step 902, a cluster master for a cluster assigns a first set of work for a first software application to a processor node for a particular satellite of the first set of satellites (e.g., a first cluster). In step 904, the processor node (or the cluster master) detects a high radiation condition at the particular satellite. In step 906, the first set of work that was assigned to the processor for the particular satellite is reassigned to a processor for a different satellite with the same cluster (the first set of satellites) in response to detecting the high radiation condition. The reassigning of work will be done by the cluster master for that cluster. In step 908, the processor for the particular satellite is shut down in response to detecting the high radiation condition. The decision to shut down the processor can be made by the satellite itself, its cluster master in the same cluster, General Administrator 32 or another entity. In step 910, the system detect that the high radiation condition for the particular satellite has ended. This detection can be performed by the actual particular satellite experiencing the high radiation condition, the cluster master for that same cluster, another satellite or another entity. In step 912, the cluster master will reassign the workload for the first software application to include the assigning of a portion of the first software application to the processor for the particular satellite in response to detecting that the high radiation condition at the particular satellite has ended. Thus, the resources used for the first software application are rebalanced to include the particular satellite that has been brought back online.

The multi-mission configurable spacecraft system described above enables quick and easy development and management of applications across multiple clusters and across 100,000's of nodes. It allows incremental updates as desired across end-to-end networks with ease—taking minutes as opposed to months. Instead of manually updating each individual node, the multi-mission configurable spacecraft system will deploy applications across nodes and across clusters of nodes. This reduces overall risks with updates by allowing small changes continuously rather than large changes with many changes. It also provides the infrastructure for quick software development. The multi-mission configurable spacecraft system also allows quick and easy deployment of security fixes across the nodes including policy changes that can provided to the whole network and/or to clusters. Security policies are quickly and easily implemented and managed.

The multi-mission configurable spacecraft system provides end-to-end network visibility. Node disruptions along with their connectivity relationship to other nodes in the system are managed and known. For complex end-to-end networks and constellations, it is useful to understand end-to-end visibility of all participating nodes. This insight provides time-sensitive information for many applications, examples include constellation management much must cross-link connectivity while avoiding debris, finding optimal routes for a given service level requirement, determining which network, compute, storage, memory, and/or accelerator resources should be utilized based on workload, etc.

The proposed system provides resource sharing and load balancing, allowing the sharing of valuable space assets across space, ground and cloud nodes. With the move toward optical crosslinks that provide a large increase in bandwidth, tasking with large amounts of data, and relatively lower bandwidth to ground (optical links may not be readily available due to cloud coverage), sharing of space assets solves a need. The ability to allow an application to utilize processor, accelerator, storage, networks, and memory resources on multiple satellites (or other spacecraft) allows quicker processing of critical data. It also minimizes the bandwidth for downlinks.

The network is able to autonomously recover and self-heal without ground intervention. The load balancer will autonomously reallocate resources across available resources (including across space nodes). In space, there can be large delays to recover from failures if it needs to be managed by the ground. Having the ability to do this in space allows much quicker recovery with shorter delays and no human intervention required.

Containers provide the ability to isolate processor, memory, storage, and network resources allowing managed shared resources and secrets. Common infrastructure across space and ground makes the system easier to maintain, hire, and provide common shared services. Quicker deployment allows quick mission updates providing more value. Shared space resources allows for higher utilization of valuable and expensive space assets. The system also provides an event store that provides wealth of data that can be utilized for business intelligence and decision making that can further enhance the systems value.

The system can easily automatically add new nodes into existing cluster. A load balancer will automatically take advantage of new resources being added to existing clusters.

One embodiment includes a method of operating a plurality of spacecrafts, comprising: deploying a first software application across a first set of the spacecrafts while the first set of spacecrafts are in orbit such that each spacecraft of the first set of spacecrafts is executing the first software application; deploying a second software application across a second set of the spacecrafts and the first set of spacecrafts while the first set of spacecrafts and the second set of spacecraft are in orbit such that each spacecraft of the first set of spacecrafts and the second set of spacecrafts is executing the second software application, the first set of spacecraft and the second set of spacecrafts are executing the second software application concurrently with the first set of spacecrafts executing the first software application, the second set of spacecrafts and the first set of spacecrafts are disjoint sets of spacecrafts because they have no spacecrafts in common; and running management software on all of the plurality of spacecraft including the first set of spacecrafts and the second set of spacecrafts.

In one example implementation, the deploying the first software application across the first set of the spacecrafts includes the first set of spacecrafts executing the first software application in a container that is in direct contact with a non-virtual operating system; and the deploying the second software application across the first set of spacecrafts and the second set of the spacecrafts includes the first set of spacecrafts and the second set of spacecrafts executing the second software application in a container that is in direct contact with a non-virtual operating system.

One example implementation further comprises deploying the first software application across a plurality of ground-based computing nodes while the first set of spacecrafts are in orbit such that each ground-based computing nodes of the plurality is executing of the first software application.

In one example implementation, the deploying the first software application across the first set of the spacecrafts includes the first set of spacecrafts executing the first software application in a container that is in direct contact with a non-virtual operating system; the deploying the second software application across the first set of spacecrafts and the second set of the spacecrafts includes the first set of spacecrafts and the second set of spacecrafts executing the second software application in a container that is in direct contact with a non-virtual operating system; and the deploying the first software application across the plurality of ground-based computing nodes includes the ground-based computing nodes executing the first software application in a container.

In one example implementation, the deploying the first software application across the first set of the satellites includes a first satellite of the first set of satellites executing the first software application using a first type of processor having a first architecture and a second spacecraft of the first set of spacecrafts executing the first software application using a second type of processor having a second architecture.

One example implementation further comprises removing the first software application from being executed by one or more spacecrafts of the first set of spacecrafts while the first set of spacecrafts are in orbit.

One example implementation further comprises deploying the first software application across one or more additional spacecrafts to the first set of spacecrafts while the first set of spacecrafts are executing the first software application.

One example implementation further comprises allocating resources on the first set of spacecrafts for use with the first software application and changing allocation of the resources on the first set of spacecrafts for use with the first software application while the first set of spacecrafts are executing the first software application, the changing allocation is performed by a node in orbit without ground intervention.

In one example implementation, the first set of spacecrafts comprise a cluster of computing nodes; one spacecraft of the first set of spacecrafts is a cluster master that controls the other computing nodes; and the method further comprises the cluster master allocating resources on the first set of spacecrafts for use with the first software application.

One example implementation further comprises the cluster master communicating with other spacecrafts of the first set of spacecrafts via direct wireless communication without communicating via ground hops.

In one example implementation, the first set of spacecrafts includes a plurality of data storage systems and the method further comprises: receiving data to be stored without receiving an indication of which spacecraft is to store the received data; storing the received data across multiple spacecrafts of the first set of spacecrafts by storing the data in multiple data storage systems.

One example implementation further comprises storing training data in a data storage system onboard one or more of the first set of spacecrafts; onboard one or more of the first set of spacecrafts, training a classifier model to establish a trained classifier based on the training data stored in the data storage system onboard one or more of the first set of spacecrafts, the classifier model is part of the first software application; storing the classifier model onboard one or more of the first set of spacecrafts; storing new data in the data storage system onboard one or more of the first set of spacecrafts; onboard one or more of the first set of spacecrafts, using the trained classifier model to classify the new data stored in the data storage system onboard one or more of the first set of spacecrafts; and reporting the classification of the new data to a ground terminal.

One example implementation further comprises: assigning a first set of work for the first software application to a processor for a particular spacecraft of the first set of spacecrafts; detecting a high radiation condition at the particular spacecraft; shutting down the processor of the particular spacecraft in response to detecting the high radiation condition; reassigning the first set of work to a processor of a different spacecraft of the first set of spacecrafts in response to detecting the high radiation condition; detecting that the high radiation condition at the particular spacecraft has ended; and reassigning the workload for the first software application including assigning a portion of the first software application to the processor for the particular spacecraft in response to detecting that the high radiation condition at the particular spacecraft has ended.

One embodiment includes a non-transitory processor readable storage device having processor readable code embodied on the processor readable storage device, the processor readable code for programming one or more processors to perform a method comprising: deploying a first software application across a first set of the spacecrafts while the first set of spacecrafts are in orbit such that each spacecraft of the first set of spacecrafts is executing the first software application in a container that is in direct contact with a non-virtual operating system; and deploying a second software application across a second set of the spacecrafts while the second set of spacecraft are in orbit such that each spacecraft of the second set of spacecrafts is executing the second software application in a container that is in direct contact with a non-virtual operating system, the second set of spacecrafts is different than the first set of spacecrafts.

One embodiment includes a system comprising a plurality of satellites in orbit and a plurality of ground-based computing nodes in communication with the satellites in orbit. Each satellite includes an antenna, a memory configured to store a non-virtualized operating system and one or more software applications, and a processor connected to the antenna and the memory. The processor is configured to run the non-virtualized operating system. The processor is configured to run the one or more software applications such that the one or more software applications are in direct contact with the non-virtualized operating system without the one or more software applications being executed by a virtual operating system. Each ground-based computing node includes a memory configured to store one or more software applications and a processor connected to the memory. The processor is configured to run the one or more software applications. A first software application is deployed across a first set of the satellites and a first set of the ground-based computing nodes concurrently while a second software application is deployed across the first set of the satellites.

In one example implementation, the first software application is deployed across the first set of the satellites and the first set of the ground-based computing nodes by processors of the first set of the satellites executing the first software application in one or more containers that are in direct contact with the respective non-virtualized operating system and by processors of the first set of the ground-based computing nodes executing the first software application in one or more containers that are in direct contact with the respective non-virtualized operating system.

In one example implementation, the first software application is deployed across the first set of the satellites such that different types of processors with different architectures on the first set of the satellites execute the first software application.

In one example implementation, the plurality of satellites comprises a cluster of computing nodes; one satellite of the plurality of satellites is a cluster master that controls the other computing nodes; the cluster master is configured to allocate resources on the first set of satellites for use with the first software application; and the cluster master is configured to change allocation of on the first set of satellites for use with the first software application.

In one example implementation, the first set of satellites includes a plurality of data storage systems; and the first set of satellites are configured to receive data to be stored and to store the received data across multiple satellites of the first set of satellites by storing the data in multiple data storage systems.

One embodiment includes a spacecraft, comprising: an antenna; a memory configured to store a non-virtualized operating system and a software application packaged in a container; and a processor connected to the antenna and the memory. The processor is configured to run the non-virtualized operating system. The processor is configured to run the software application in the container such that the software application in the container is in direct contact with the non-virtualized operating system without the software application being executed by a virtual operating system, the processor is configured to wirelessly communicate with a master satellite to receive instructions for executing the software application in the container from the master satellite.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more others parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope of be defined by the claims appended hereto.

What is claimed is:

1. A method of operating a plurality of spacecrafts, comprising:
deploying a first software application across a first set of the spacecrafts while the first set of spacecrafts are in orbit such that each spacecraft of the first set of spacecrafts is executing the first software application;
deploying a second software application across a second set of the spacecrafts and the first set of spacecrafts while the first set of spacecrafts and the second set of spacecraft are in orbit such that each spacecraft of the first set of spacecrafts and the second set of spacecrafts is executing the second software application, the first set of spacecraft and the second set of spacecrafts are executing the second software application concurrently while the first set of spacecrafts are executing the first software application, the second set of spacecrafts and the first set of spacecrafts are disjoint sets of spacecrafts;
running management software on all of the plurality of spacecraft including the first set of spacecrafts and the second set of spacecrafts;
assigning a first set of work for the first software application to a processor for a particular spacecraft of the first set of spacecrafts;
detecting a high radiation condition at the particular spacecraft;
shutting down the processor of the particular spacecraft in response to detecting the high radiation condition;
reassigning the first set of work to a processor of a different spacecraft of the first set of spacecrafts in response to detecting the high radiation condition;
detecting that the high radiation condition at the particular spacecraft has ended; and
reassigning the workload for the first software application including assigning a portion of the first software application to the processor for the particular spacecraft in response to detecting that the high radiation condition at the particular spacecraft has ended.

2. The method of claim 1, wherein:
the deploying the first software application across the first set of the spacecrafts includes the first set of spacecrafts executing the first software application in a container that is in direct contact with a non-virtual operating system; and
the deploying the second software application across the first set of spacecrafts and the second set of the spacecrafts includes the first set of spacecrafts and the second set of spacecrafts executing the second software application in a container that is in direct contact with a non-virtual operating system.

3. The method of claim 1, further comprising:
deploying the first software application across a plurality of ground-based computing nodes while the first set of spacecrafts are in orbit such that each ground-based computing nodes of the plurality is executing of the first software application.

4. The method of claim 1, wherein:
the deploying the first software application across the first set of the spacecrafts includes the first set of spacecrafts executing the first software application in a container that is in direct contact with a non-virtual operating system;
the deploying the second software application across the first set of spacecrafts and the second set of the spacecrafts includes the first set of spacecrafts and the second set of spacecrafts executing the second software application in a container that is in direct contact with a non-virtual operating system; and
the deploying the first software application across the plurality of ground-based computing nodes includes the ground-based computing nodes executing the first software application in a container.

5. The method of claim 1, wherein:
the deploying the first software application across the first set of the satellites includes a first satellite of the first set of satellites executing the first software application using a first type of processor having a first architecture and a second spacecraft of the first set of spacecrafts executing the first software application using a second type of processor having a second architecture.

6. The method of claim 1, further comprising:
removing the first software application from being executed by one or more spacecrafts of the first set of spacecrafts while the first set of spacecrafts are in orbit.

7. The method of claim 1, further comprising:
deploying the first software application across one or more additional spacecrafts to the first set of spacecrafts while the first set of spacecrafts are executing the first software application.

8. The method of claim 1, further comprising:
allocating resources on the first set of spacecrafts for use with the first software application; and
changing allocation of the resources on the first set of spacecrafts for use with the first software application while the first set of spacecrafts are executing the first software application, the changing allocation is performed by a node in orbit without ground intervention.

9. The method of claim 1, wherein:
the first set of spacecrafts comprise a cluster of computing nodes;
one spacecraft of the first set of spacecrafts is a cluster master that controls the other computing nodes; and
the method further comprises the cluster master allocating resources on the first set of spacecrafts for use with the first software application.

10. The method of claim 9, further comprising:
the cluster master communicating with other spacecrafts of the first set of spacecrafts via direct wireless communication without communicating via ground hops.

11. The method of claim 1, wherein the first set of spacecrafts includes a plurality of data storage systems, the method further comprises:
receiving data to be stored without receiving an indication of which spacecraft is to store the received data; and
storing the received data across multiple spacecrafts of the first set of spacecrafts by storing the data in multiple data storage systems.

12. A method of operating a plurality of spacecrafts, comprising:
- deploying a first software application across a first set of the spacecrafts while the first set of spacecrafts are in orbit such that each spacecraft of the first set of spacecrafts is executing the first software application;
- deploying a second software application across a second set of the spacecrafts and the first set of spacecrafts while the first set of spacecrafts and the second set of spacecraft are in orbit such that each spacecraft of the first set of spacecrafts and the second set of spacecrafts is executing the second software application, the first set of spacecraft and the second set of spacecrafts are executing the second software application concurrently while the first set of spacecrafts are executing the first software application, the second set of spacecrafts and the first set of spacecrafts are disjoint sets of spacecrafts;
- running management software on all of the plurality of spacecraft including the first set of spacecrafts and the second set of spacecrafts;
- storing training data in a data storage system onboard one or more of the first set of spacecrafts;
- onboard one or more of the first set of spacecrafts, training a classifier model to establish a trained classifier based on the training data stored in the data storage system onboard one or more of the first set of spacecrafts, the classifier model is part of the first software application;
- storing the classifier model onboard one or more of the first set of spacecrafts;
- storing new data in the data storage system onboard one or more of the first set of spacecrafts;
- onboard one or more of the first set of spacecrafts, using the trained classifier model to classify the new data stored in the data storage system onboard one or more of the first set of spacecrafts; and
- reporting the classification of the new data to a ground terminal.

13. One or more non-transitory processor readable storage devices having processor readable code embodied on the processor readable storage devices, the processor readable code for programming one or more processors to perform a method comprising:
- deploying a first software application across a first set of spacecrafts while the first set of spacecrafts are in orbit such that each spacecraft of the first set of spacecrafts is executing the first software application in a container that is in direct contact with a non-virtual operating system;
- deploying a second software application across a second set of spacecrafts while the second set of spacecraft are in orbit such that each spacecraft of the second set of spacecrafts is executing the second software application in a container that is in direct contact with a non-virtual operating system, the second set of spacecrafts is different than the first set of spacecrafts;
- storing training data in a data storage system onboard one or more of the first set of spacecrafts;
- onboard one or more of the first set of spacecrafts, training a classifier model to establish a trained classifier based on the training data stored in the data storage system onboard one or more of the first set of spacecrafts, the classifier model is part of the first software application;
- storing the classifier model onboard one or more of the first set of spacecrafts;
- storing new data in the data storage system onboard one or more of the first set of spacecrafts;
- onboard one or more of the first set of spacecrafts, using the trained classifier model to classify the new data stored in the data storage system onboard one or more of the first set of spacecrafts; and
- reporting the classification of the new data to a ground terminal.

14. A system, comprising:
- a plurality of satellites in orbit such that each satellite includes an antenna, a memory configured to store a non-virtualized operating system and one or more software applications and a processor connected to the antenna and the memory, the processor is configured to run the non-virtualized operating system, the processor is configured to run the one or more software applications such that the one or more software applications are in direct contact with the non-virtualized operating system without the one or more software applications being executed by a virtual operating system, a first software application is deployed across a first set of the satellites, the plurality of satellites comprises a cluster of computing nodes, one satellite of the plurality of satellites is a cluster master that controls the other computing nodes, the cluster master is configured to:
  - assign a first set of work for the first software application to a processor for a particular satellite of the plurality of satellites,
  - detecting a high radiation condition at the particular satellite,
  - shutting down the processor of the particular satellite in response to detecting the high radiation condition,
  - reassigning the first set of work to a processor of a different satellite of the plurality of satellites in response to detecting the high radiation condition,
  - detecting that the high radiation condition at the particular satellite has ended, and
  - reassigning the workload for the first software application including assigning a portion of the first software application to the processor for the particular satellite in response to detecting that the high radiation condition at the particular satellite has ended; and
- a plurality of ground-based computing nodes, each ground-based computing node includes a memory configured to store one or more software applications and a processor connected to the memory, the processor is configured to run the one or more software applications, a second software application is deployed across a subset of the satellites and a first set of the ground-based computing nodes concurrently while the first software application is deployed across the first set of the satellites.

15. A spacecraft, comprising:
- an antenna;
- a memory configured to store a non-virtualized operating system and a software application packaged in a container; and
- a processor connected to the antenna and the memory, the processor is configured to run the non-virtualized operating system, the processor is configured to run the software application in the container such that the software application in the container is in direct contact with the non-virtualized operating system without the software application being executed by a virtual operating system, the processor is configured to wirelessly communicate with a master satellite to receive instructions for executing the software application in the container from the master satellite, the process configured to:
store training data in the memory onboard the spacecraft,
train a classifier model onboard the spacecraft to establish a trained classifier based on the training data stored in the memory, the classifier model is part of the software application,
store the classifier model onboard the spacecraft,
store new data in the memory onboard the spacecraft,
use the trained classifier model in the memory onboard the spacecraft to classify the new data stored, and
report the classification of the new data to a ground terminal.

* * * * *

UNITED STATES PATENT AND TRADEMARK OFFICE
CERTIFICATE OF CORRECTION

PATENT NO. : 11,385,887 B2
APPLICATION NO. : 17/110115
DATED : July 12, 2022
INVENTOR(S) : Schmit et al.

It is certified that error appears in the above-identified patent and that said Letters Patent is hereby corrected as shown below:

In the Claims

Column 25, Line 27 (Claim 1) change "spacecraft" to -- spacecrafts --.
Column 25, Line 30 (Claim 1) change "spacecraft" to -- spacecrafts --.
Column 26, Line 5 (Claim 3) change "executing of the" to -- executing the --.
Column 27, Line 10 (Claim 5) change "spacecraft" to -- spacecrafts --.
Column 27, Line 13 (Claim 5) change "spacecraft" to -- spacecrafts --.
Column 27, Line 51 (Claim 5) change "spacecraft" to -- spacecrafts --.

Signed and Sealed this
Twenty-second Day of November, 2022

Katherine Kelly Vidal
*Director of the United States Patent and Trademark Office*